(12) United States Patent
Kishine

(10) Patent No.: US 9,958,701 B2
(45) Date of Patent: *May 1, 2018

(54) METHOD FOR MANUFACTURING IMAGING MODULE AND IMAGING-MODULE MANUFACTURING DEVICE

(71) Applicant: FUJIFILM Corporation, Tokyo (JP)

(72) Inventor: Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/233,094

(22) Filed: Aug. 10, 2016

(65) Prior Publication Data

US 2016/0349528 A1    Dec. 1, 2016

Related U.S. Application Data

(63) Continuation of application No. PCT/JP2014/081710, filed on Dec. 1, 2014.

(30) Foreign Application Priority Data

Feb. 26, 2014    (JP) .................................. 2014-035033

(51) Int. Cl.
  *G02B 27/62*    (2006.01)
  *G03B 5/00*    (2006.01)
  (Continued)

(52) U.S. Cl.
  CPC ................ *G02B 27/62* (2013.01); *C09J 5/00* (2013.01); *G02B 7/025* (2013.01); *G02B 7/08* (2013.01);
  (Continued)

(58) Field of Classification Search
  CPC ............ B32B 37/12; B32B 2037/1253; B32B 2307/40; B32B 2551/00; G02B 27/62;
  (Continued)

(56) References Cited

U.S. PATENT DOCUMENTS

2009/0067827 A1    3/2009  Yoshida et al.
2009/0180021 A1*   7/2009  Kikuchi ............... H04N 5/2253
                                                     348/349

(Continued)

FOREIGN PATENT DOCUMENTS

JP    2006-217217 A    8/2006
JP    2009-71495 A     4/2009

(Continued)

OTHER PUBLICATIONS

International Preliminary Report on Patentability for PCT/JP2014/081710 (PCT/IPEA/409) with Notification of Transmittal (PCT/IPEA/416) dated Jun. 23, 2015.

(Continued)

*Primary Examiner* — George Koch
(74) *Attorney, Agent, or Firm* — Birch, Stewart, Kolasch & Birch, LLP

(57) ABSTRACT

Provided are a method for manufacturing an imaging-module and an imaging-module manufacturing device that can increase the flexibility of the component arrangement in an electronic device. A relative position of the lens unit and the imaging device unit, held on an axis perpendicular to a measurement chart, and the measurement chart on the axis is changed and images of the measurement chart are captured at the relative positions in the state where, when the lens unit is installed in an electronic device, a magnetic field having a magnitude equal to a magnitude of a magnetic field applied to the movable image-stabilizing unit is applied to the movable image-stabilizing unit. A compensation amount (Continued)

is calculated using signals acquired by capturing the images of the measurement chart, a tilt of the imaging device unit relative to the lens unit is adjusted, and the imaging device unit is fixed to the lens unit.

20 Claims, 19 Drawing Sheets

(51) Int. Cl.
| | |
|---|---|
| *H04N 5/225* | (2006.01) |
| *G02B 7/08* | (2006.01) |
| *G02B 13/00* | (2006.01) |
| *G02B 27/64* | (2006.01) |
| *G03B 43/00* | (2006.01) |
| *H04N 5/232* | (2006.01) |
| *C09J 5/00* | (2006.01) |
| *G02B 7/02* | (2006.01) |

(52) U.S. Cl.
CPC ....... *G02B 13/0045* (2013.01); *G02B 27/646* (2013.01); *G03B 5/00* (2013.01); *G03B 43/00* (2013.01); *H04N 5/2257* (2013.01); *H04N 5/2328* (2013.01); *G03B 2205/0007* (2013.01)

(58) Field of Classification Search
CPC ........ G02B 27/646; G03B 5/00; G03B 43/00; G03B 2205/0007; H04N 5/2257; H04N 5/2328; H04N 5/23287
See application file for complete search history.

(56) References Cited

U.S. PATENT DOCUMENTS

| | | | |
|---|---|---|---|
| 2013/0314810 A1* | 11/2013 | Sekimoto | ............... G02B 7/021 359/823 |
| 2015/0118447 A1* | 4/2015 | Fujikawa | ............... H05K 3/305 428/172 |

FOREIGN PATENT DOCUMENTS

| | | |
|---|---|---|
| JP | 2010-21985 A | 1/2010 |
| JP | 2012-256017 A | 12/2012 |

OTHER PUBLICATIONS

International Search Report for PCT/JP2014/081710 (PCT/ISA/210) dated Jan. 27, 2015.
Written Opinion of the International Searching Authority for for PCT/JP2014/081710 (PCT/ISA/237) dated Jan. 27, 2015.
English translation of International Preliminary Report on Patentability for PCT/JP2014/081710 (Form PCT/IPEA/409).

* cited by examiner

FIG. 13A
COMPARATIVE EXAMPLE
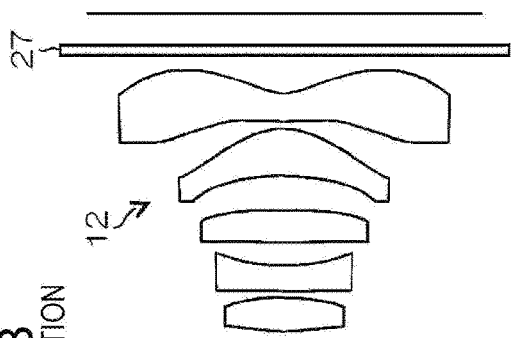
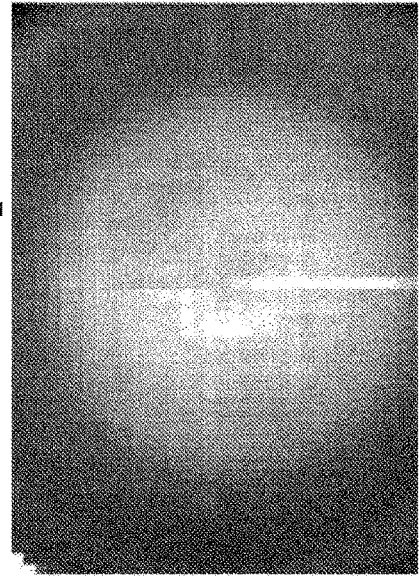
RESOLUTION OVER SCREEN IS VARIED BY TILT
FIG. 13B
PRESENT INVENTION
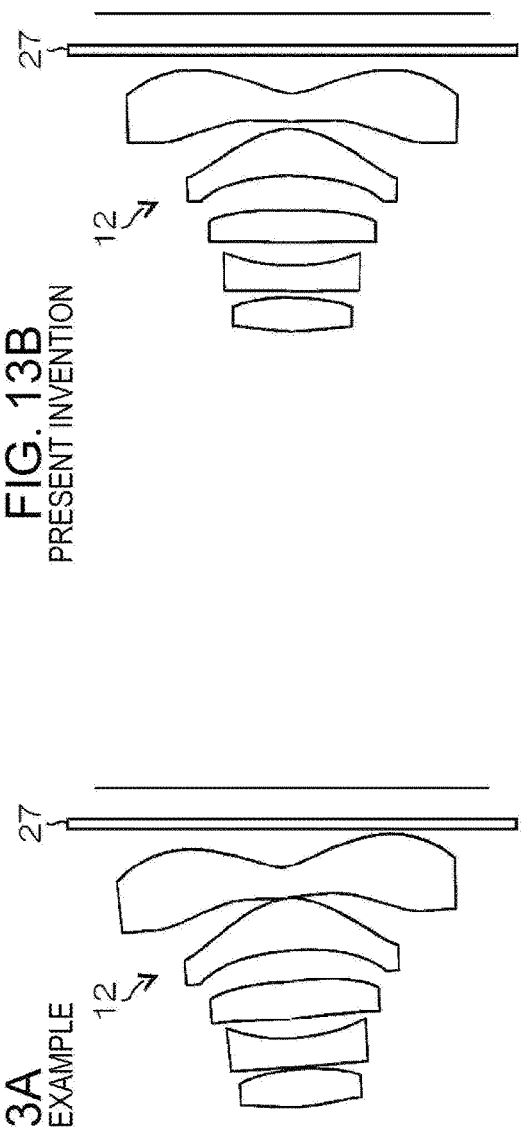
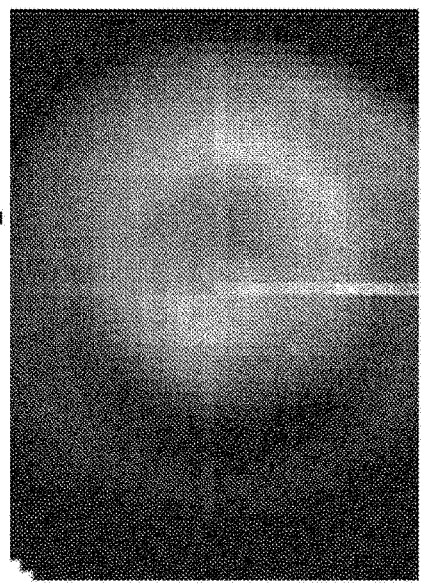
UNIFORMITY OF RESOLUTION IS ENHANCED AS A RESULT OF MAGNETIC FIELD ADJUSTING TILT

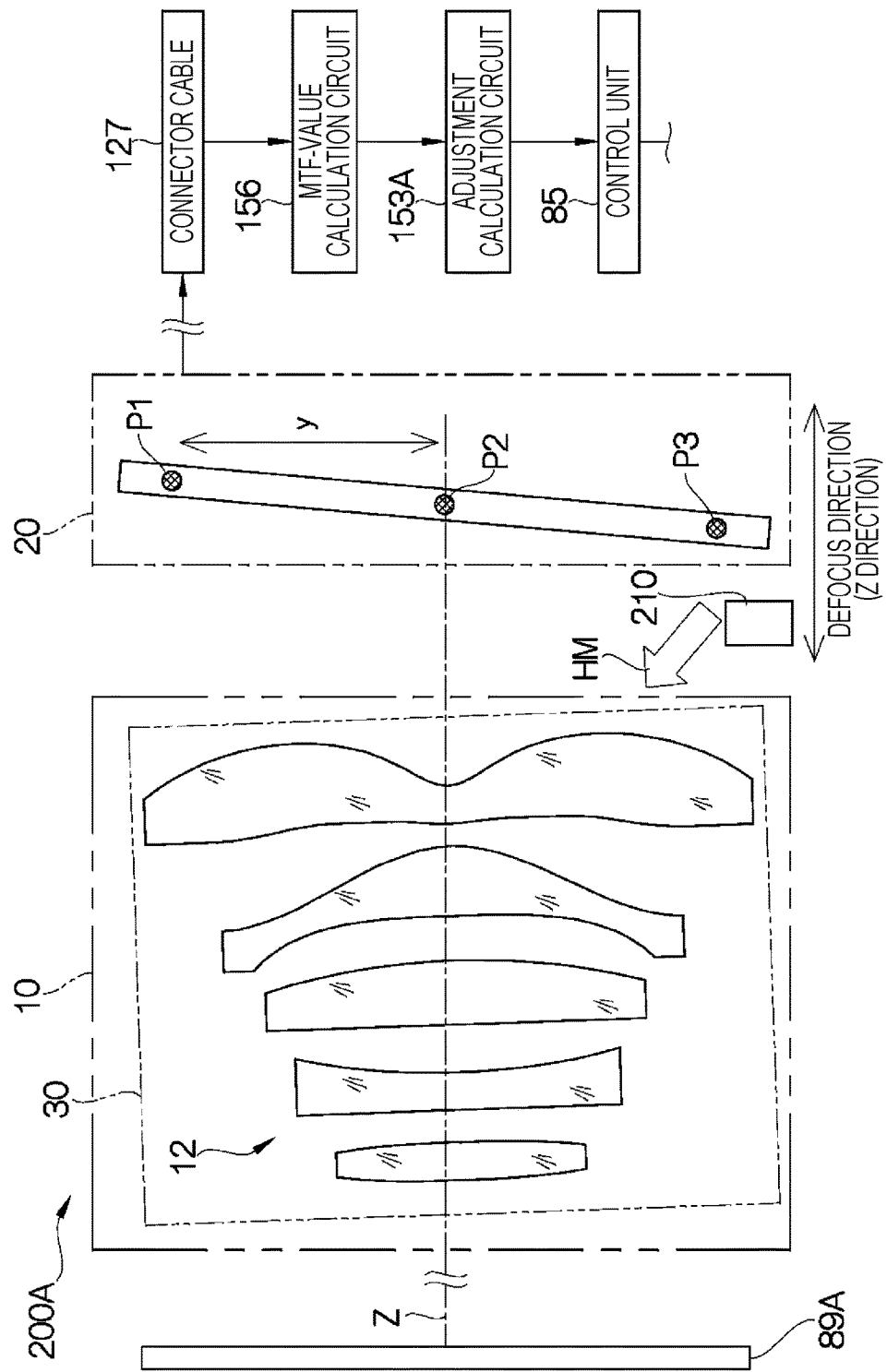

DENSITY
10 PIXELS TO 20 PIXELS

DENSITY
2 PIXELS TO 4 PIXELS

METHOD FOR MANUFACTURING IMAGING MODULE AND IMAGING-MODULE MANUFACTURING DEVICE

CROSS-REFERENCE TO RELATED APPLICATIONS

This application is a Continuation of PCT International Application No. PCT/JP2014/081710 filed on Dec. 1, 2014, which claims priority under 35 U.S.C. § 119(a) to Japanese Patent Application No. 2014-035033 filed on Feb. 26, 2014. Each of the above application(s) is hereby expressly incorporated by reference, in its entirety, into the present application.

BACKGROUND OF THE INVENTION

1. Field of the Invention

The present invention relates to a method and a device for manufacturing an imaging module having an optical image stabilizing function.

2. Description of the Related Art

As is well known in recent years, some of imaging modules installed in electronic devices, such as mobile phones, smartphones, or tablet computers, have an optical image stabilizer (OIS) function (see JP2012-256017A).

An OIS mechanism disclosed in JP2012-256017A employs a so-called suspension support structure. The OIS mechanism has a structure in which a movable image-stabilizing unit (imaging unit) is supported at four corners using four suspension wires and the movable image-stabilizing unit is driven in two-axis directions perpendicular to the optical axis for image stabilization. A mechanism for driving the movable image-stabilizing unit includes magnets, disposed on four outer-peripheral side surfaces of a cover portion on which the movable image-stabilizing unit is mounted, and a coil, disposed on a fixed-body-side yoke so as to oppose the magnets. This driving mechanism allows the movable image-stabilizing unit to be driven for image stabilization independently of two axes perpendicular to the optical axis.

An imaging module is manufactured as a result of fixing a lens unit having such an OIS mechanism (having a movable image-stabilizing unit and suspension wires) and a lens group to an imaging device unit having an imaging device. When the lens unit and the imaging device unit are fixed to each other, a so-called one-sided blurring problem, which renders a portion of an image out of focus, occurs unless the position of the lens group relative to the imaging device is accurately set. Thus, a method is provided for fixing a lens unit to an imaging device unit in the state where a lens group is adjusted to be in a predetermined reference position using a jig disclosed in, for example, JP2012-256017A.

JP2010-021985A discloses the following method for manufacturing an imaging module. In the method, an imaging device unit and a lens unit are set on an axis perpendicular to a measurement chart. The relative position of the imaging device unit, the lens unit, and the measurement chart on the axis is changed. A reference position of a lens group is calculated on the basis of results obtained after an imaging device captures images of the measurement chart multiple times at the relative positions. The imaging device unit and the lens unit are fixed to each other in the state where the tilts and the positions of the imaging device unit and the lens unit have been adjusted on the basis of these calculated results.

An imaging module having an OIS mechanism of a suspension support structure is affected by a magnetic field produced by an electronic device on which this imaging module is mounted. FIG. 20 is a cross-sectional view of a main portion of a smartphone 2 when an imaging module 1 is mounted on the smartphone 2. As illustrated in this drawing, a speaker 3 is disposed near the imaging module 1. Thus, the imaging module 1 is affected by a magnetic force generated by the speaker 3, thereby resulting in a problem of tilting of the lens group from the reference position.

JP2009-071495A describes that when a speaker, which is a magnetic-field generating unit, has a magnetic force of 100 gausses, a reliable operation of an imaging module is ensured in a state where the imaging module is spaced apart from the speaker by 10 mm or longer.

SUMMARY OF THE INVENTION

As in the case of the invention described in JP2009-071495A, an imaging module is usually disposed in an electronic device so as to be spaced a distance apart from a magnetic-field generating unit. However, because of reasons such as the design or space of the electronic device, in some cases, the imaging module has to be disposed near the magnetic-field generating unit in the electronic device. In such cases, the movable image-stabilizing unit is tilted by being affected by the magnetic field produced by the magnetic-field generating unit. This causes a problem of tilting of the lens group in the movable image-stabilizing unit from a predetermined reference position.

The present invention was made in view of such circumstances. An object of the present invention is to provide a method and a device for manufacturing an imaging module that can increase the flexibility of the component arrangement in an electronic device.

A method for manufacturing an imaging module provided to achieve the object of the invention is a method for manufacturing an imaging module. The imaging module includes a lens unit having a less group and an imaging device unit being fixed to the lens unit and having an imaging device that captures an image of an object through the lens group. The lens unit includes a movable image-stabilizing unit having the lens group and a magnetic member and an elastic support unit supporting the movable image-stabilizing unit such that the movable image-stabilizing unit is movable in a direction perpendicular to an optical axis of the lens group and tiltable around an axis perpendicular to the optical axis. The method includes a first step of holding the lens unit and the imaging device unit on an axis perpendicular to a measurement chart, a second step of changing a relative position of the lens unit and the imaging device unit, held on the axis perpendicular to the measurement chart, and the measurement chart on the axis and capturing images of the measurement chart using the imaging device at the respective relative position, and a third step of calculating a compensation amount using image-capturing signals acquired as a result of the imaging device capturing the images of the measurement chart, a tilt of the imaging device unit relative to the lens unit is adjusted, and the imaging device unit is fixed to the lens unit. In the second step, the images are captured in the state where a magnetic field having a magnitude equal to a magnitude of a magnetic field applied to the movable image-stabilizing unit when the lens unit is installed in an electronic device including a magnetic-field generating unit is applied to the movable image-stabilizing unit.

According to the present invention, the tilt of the imaging device unit relative to the lens unit is adjusted on the basis of the compensation amount calculated in the state where the magnetic field having a magnitude equal to the magnitude of a magnetic field applied to the movable image-stabilizing unit when the lens unit is installed in the electronic device is applied to the movable image-stabilizing unit. Thus, when the imaging module is installed in the electronic device, the movable image-stabilizing unit is tilted due to the magnetic field being applied from the magnetic-field generating unit to the lens unit, so that the lens group is adjusted to be in the reference position. The lens group can thus be adjusted to be in the reference position even when the imaging module is disposed near the magnetic-field generating unit in the electronic device. Consequently, the resolution over the screen displaying an image captured by the imaging module can be rendered uniform.

In the method for manufacturing an imaging module according to another aspect of the present invention, preferably, the magnetic field is applied to the movable image-stabilizing unit by an electromagnet in the second step. The magnitude of the magnetic field applied to the movable image-stabilizing unit can be adjusted by increasing or decreasing the electric current supplied to the electromagnet. This configuration enables an application of a magnetic field corresponding to an electronic device of a specific model and an imaging module of a specific model to the movable image-stabilizing unit.

In a method for manufacturing an imaging module according to another aspect of the present invention, in the third step, the lens unit and the imaging device unit are fixed to each other by causing an adhesive supplied to a portion between the lens unit and the imaging device unit to cure after a tilt of the imaging device unit relative to the lens unit is adjusted. Thus, the lens unit and the imaging device unit can be fixed to each other after the tilt of the imaging device unit relative to the lens unit is adjusted.

In a method for manufacturing an imaging module according to another aspect of the present invention, a pixel pitch of the imaging device is preferably smaller than or equal to 1.0 µm. The narrower the pixel pitch of the imaging device becomes, the smaller the radius of a permissible circle of confusion gets, which result in smaller depth of focus. Thus, when the pixel pitch is smaller than or equal to 1.0 µm, the position of the lens group relative to the imaging device has to be determined (faced) with high accuracy. The imaging module achieved by the present invention determines the position of the lens group relative to the imaging device with high accuracy.

An imaging-module manufacturing device for achieving the object of the present invention includes an imaging-device-unit holding portion that holds an imaging device unit on an axis perpendicular to a measurement chart installed on a measurement-chart installation portion, the imaging device unit having an imaging device that captures an image of an object through a lens unit having a lens group; a lens-unit holding portion that holds the lens unit at a position on the axis between the measurement-chart installation portion and the imaging-device-unit holding portion; a control unit that changes a relative position of the measurement-chart installation portion, the lens-unit holding portion, and the imaging-device-unit holding portion on the axis and captures images of the measurement chart installed on the measurement-chart installation portion at the respective relative position using the imaging device of the imaging device unit held by the imaging-device-unit holding portion through the lens unit held by the lens-unit holding portion; an adjustment portion that adjusts a tilt of the imaging device unit held by the imaging-device-unit holding portion relative to the lens unit held by the lens-unit holding portion on a basis of image-capturing signals acquired as a result of the imaging device capturing the images of the measurement chart; a unit-fixing portion that fixes the imaging device unit adjusted by the adjustment portion to the lens unit; and a magnetic-field applying portion that applies a magnetic field having a magnitude equal to a magnitude of a magnetic field applied to the lens unit in the state where the lens unit is installed in an electronic device including a magnetic-field generating unit to the lens unit.

According to the present invention, the lens group can thus be adjusted to be in the reference position even when the imaging module is disposed near the magnetic-field generating unit in the electronic device. Consequently, the resolution over the screen displaying an image captured by the imaging module can be rendered uniform.

In an imaging-module manufacturing device according to another aspect of the present invention, preferably, the magnetic-field applying portion is an electromagnet. The magnitude of the magnetic field applied to the lens unit can be adjusted by increasing or decreasing the electric current supplied to the electromagnet. This configuration enables an application of a magnetic field corresponding to an electronic device of a specific model and an imaging module of a specific model to the lens unit.

An imaging-module manufacturing device according to another aspect of the present invention preferably includes a magnetic-field-intensity measuring portion that measures an intensity of the magnetic field applied from the magnetic-field applying portion to the lens unit. This configuration enables an operator to confirm whether the magnetic field having a magnitude equal to a magnitude of a magnetic field applied to the lens unit when the imaging module is installed in an electronic device is applied to the lens unit. Thus, the tilt can be adjusted with high accuracy.

In an imaging-module manufacturing device according to another aspect of the present invention, preferably, the magnetic-field-intensity measuring portion is movable between a measurement position, located near the lens unit and at which an intensity of the magnetic field applied to the lens unit is measurable, and a retract position, located away from the measurement position. Thus, the magnetic-field-intensity measuring portion is prevented from disturbing an adjustment performed by the adjustment portion.

In an imaging-module manufacturing device according to another aspect of the present invention, preferably, the measurement position is in a space occupied by the lens unit when the lens unit is held by the lens-unit holding portion. This configuration enables an accurate measurement of the intensity of the magnetic field applied from the magnetic-field applying portion to the lens unit.

In an imaging-module manufacturing device according to another aspect of the present invention, the unit-fixing portion fixes the lens unit and the imaging device to each other by causing an adhesive supplied to a portion between the lens unit and the imaging device unit to cure after the adjustment portion performs an adjustment. Thus, the lens unit and the imaging device unit can be fixed to each other after the tilt of the imaging device unit relative to the lens unit is adjusted.

In an imaging-module manufacturing device according to another aspect of the present invention, the imaging device captures images of the measurement chart in the state where the magnetic field is applied to the lens unit by the magnetic-field applying portion. Thus, the imaging device can capture images in the state where the lens unit is tilted in the same manner as in the case of the lens unit installed in the electronic device. Consequently, the adjustment portion can perform a tilt adjustment in consideration of the tilt of the lens unit resulting from an application of the magnetic field when the imaging module is installed in an electronic device.

A method and a device for manufacturing an imaging module according to the present invention can provide an imaging module that increases the flexibility of the component arrangement in an electronic device.

BRIEF DESCRIPTION OF THE DRAWINGS

FIG. 13A illustrates a relationship between an imaging device unit and a lens group of an existing imaging module according to a comparative example and a distribution of the resolution over a screen of the imaging device and FIG. 13B illustrates a relationship between an imaging device unit and a lens group of an imaging module according to the present invention and a distribution of the resolution over a screen of the imaging device;

FIG. 14 is a schematic diagram of an imaging-module manufacturing device according to a second embodiment;

DESCRIPTION OF THE PREFERRED EMBODIMENTS

Referring to the attached drawings, a method and a device for manufacturing an imaging module according to the present invention are described below.

<Configuration of Imaging Module>

Figure 1:
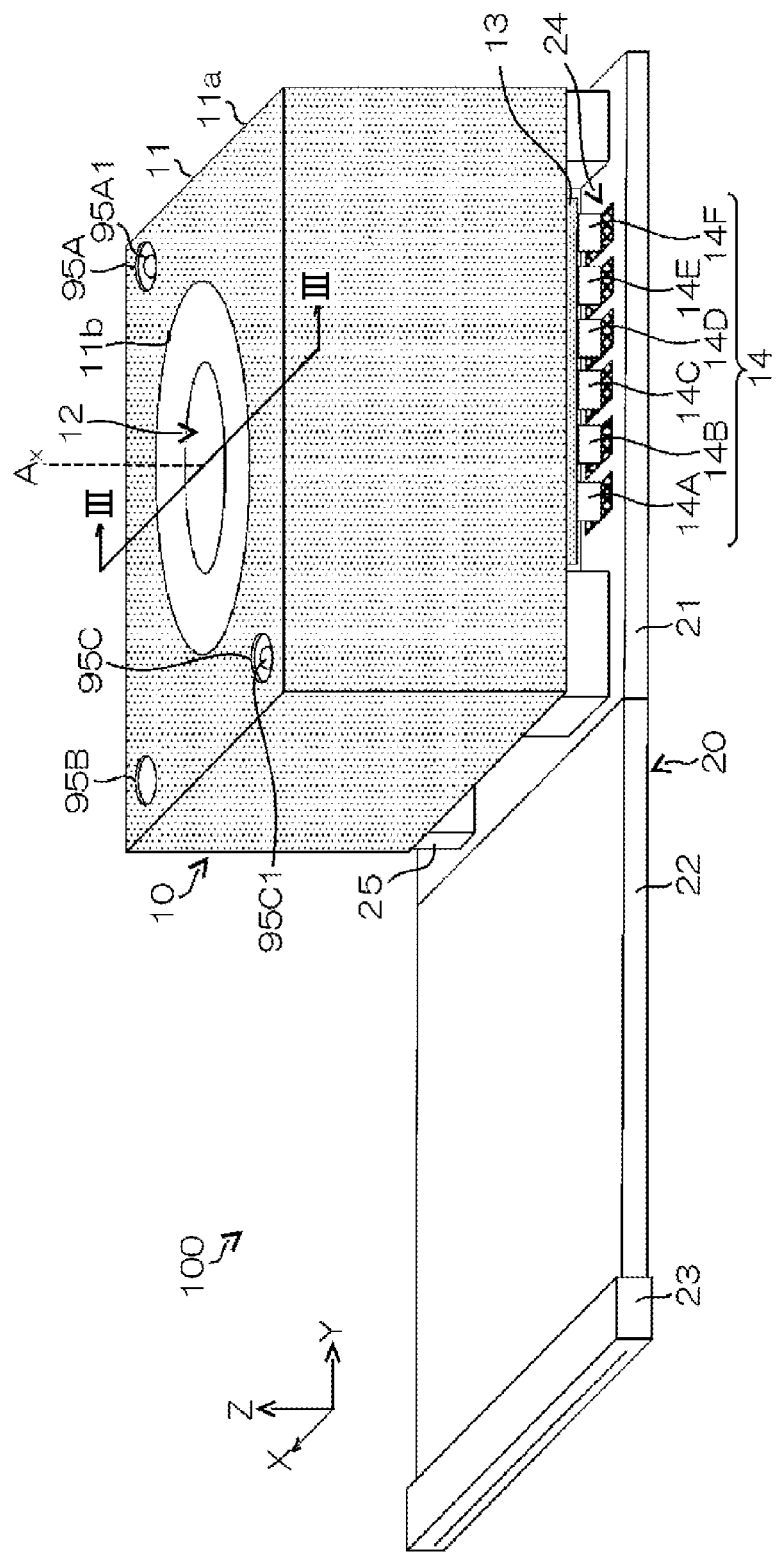
FIG. 1 is a perspective view of the exterior of an imaging module.

FIG. 1 is a perspective view of the exterior of an imaging module 100 manufactured by a method and a device for manufacturing an imaging module according to the present invention.

Figure 2:
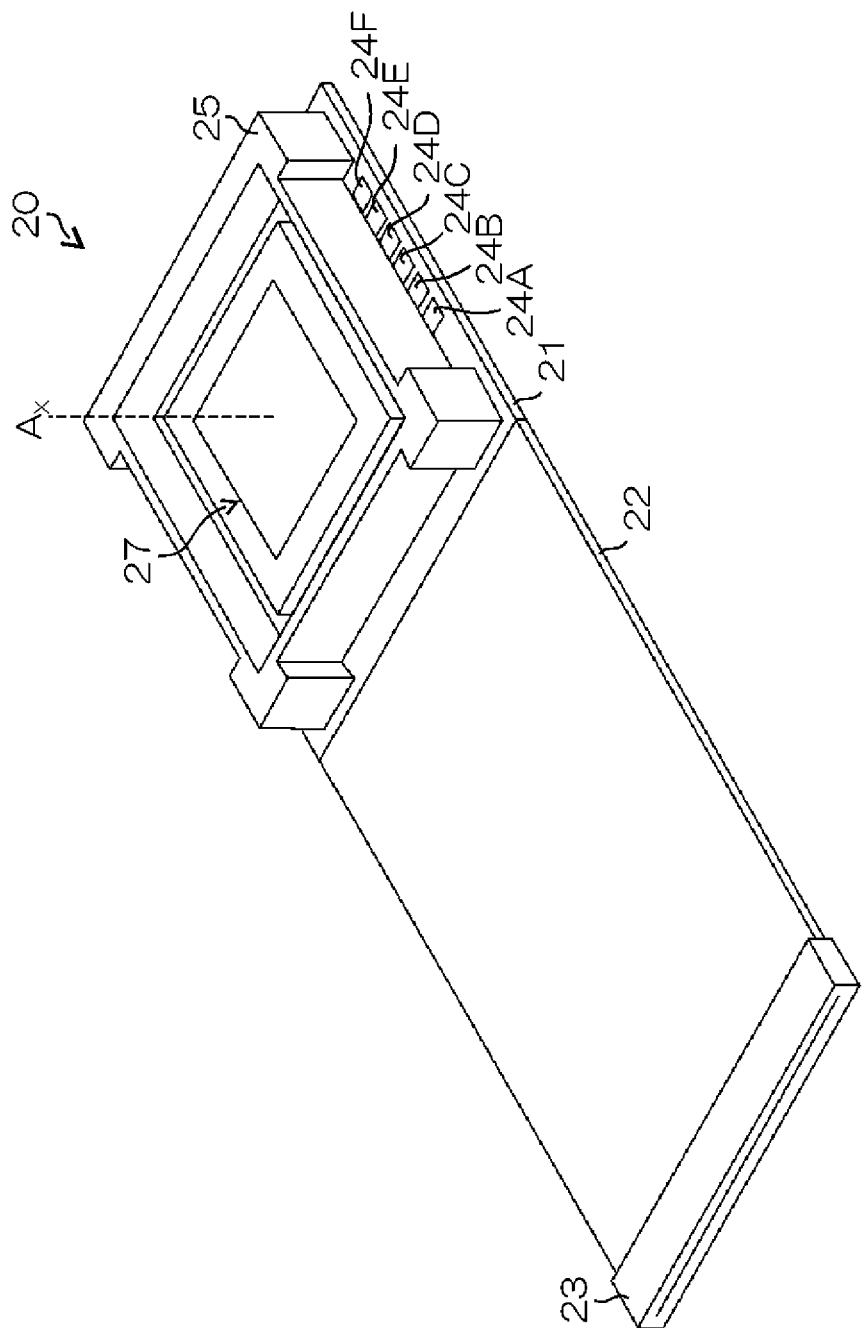
FIG. 2 is a perspective view of the exterior of an imaging device unit.

The imaging module 100 includes a lens unit 10, which includes a lens group 12, and an imaging device unit 20, which includes an imaging device 27 (see FIG. 2). The imaging device 27 captures an image of an object through the lens group 12. In FIG. 1, a direction of an axis perpendicular to an imaging surface of the imaging device 27 is illustrated as a Z direction and two directions perpendicular to the Z direction and perpendicular to each other are illustrated as an X direction and a Y direction.

The lens unit 10 includes a housing 11, which accommodates components described below. In an upper surface 11a of the housing 11, an opening 11b, which uses the optical axis Ax of the lens group 12 as its center, is formed. The imaging module 100 captures images by taking object light into the lens group 12 through the opening 11b.

Positioning recessed portions 95A, 95B, and 95C for holding the lens unit 10 in the manufacturing device during manufacturing of the imaging module 100 are formed in the upper surface 11a. Recessed portions 95A1 and 95C1, smaller than the respective recessed portions 95A and 95C, are formed in the bottom surfaces of the recessed portions 95A and 95C, which are disposed on a diagonal line of the upper surface 11a.

A flexible board 13 accommodated in the housing 11 is partially exposed to the outside of the housing 11. A lens-unit terminal unit 14 including terminals 14A to 14F is connected to an end portion of the exposed portion of a flexible board 13. The lens-unit terminal unit 14 is exposed from the surfaces of the housing 11 other than the upper surface 11a. As described below, the lens-unit terminal unit 14 includes terminals other than the terminals 14A to 14F. However, for simplicity, FIG. 1 illustrates only the terminals 14A to 14F and abbreviates illustrations of other terminals.

FIG. 2 is a perspective view of the exterior of the imaging module 100 illustrated in FIG. 1 from which the lens unit 10 is omitted.

As illustrated in FIG. 2, the imaging device unit 20 includes a substrate 21, on which an imaging device 27 such as a charge coupled device (CCD) image sensor or a complementary metal oxide semiconductor (CMOS) image sensor is mounted, and a flexible board 22, electrically connected to the substrate 21.

Although the pixel pitch of the imaging device 27 is not limited to a particular pixel pitch, an imaging device having a pixel pitch of 1.0 μm or smaller is used in this embodiment. Here, the pixel pitch represents the smallest distance among center-to-center distances between photoelectric conversion regions contained in pixels included in the imaging device 27.

With a recent increase in number of pixels, the pixel pitch of an imaging device has been decreasing. Decreasing of the pixel pitch results in a reduction of the area per pixel. This reduces the radius of a permissible circle of confusion and a depth of focus. In addition, with a need for increasing the amount of light condensed per pixel, the f-number of a lens is likely to decrease. Because of these reasons, recent imaging modules have a very shallow depth of focus and thus the positions of the lens unit and the imaging device unit are required to be determined with high accuracy. When the pixel pitch is 1.0 μm or smaller, extremely high positioning accuracy is required.

A tube-shaped base member 25 having an opening corresponding to the imaging device 27 is disposed on the substrate 21 and the imaging device 27 is disposed inside the base member 25. A cover glass piece 26 (see FIG. 3) is fitted into the hollow portion of the base member 25 above the imaging device 27.

At a portion on the surface of the substrate 21 located out of the base member 25, an imaging-device-unit terminal unit 24 (see FIG. 1) including terminals 24A to 24F for electrical connection with the lens unit 10 is disposed. As in the case of the lens-unit terminal unit 14, only some of terminals of this imaging-device-unit terminal unit 24 are illustrated.

On the substrate 21, an imaging-device wire that is to be connected to terminals such as a data-output terminal and a driving terminal of the imaging device 27 is disposed. The imaging-device wire is connected to an external connection terminal unit 23, disposed at an end portion of the flexible board 22, by way of a wire disposed at the flexible board 22. The external connection terminal unit 23 functions as an electrical connection portion that is electrically connected to the imaging device 27.

A lens-unit wire connected to each terminal in the imaging-device-unit terminal unit is also disposed on the substrate 21. The lens-unit wire is connected to the external connection terminal unit 23, disposed at the end portion of the flexible board 22, by way of the wire disposed at the flexible board 22.

In the state where the lens unit 10 and the imaging device unit 20 are fixed to each other, each terminal of the lens-unit terminal unit and the corresponding terminal of the imaging-device-unit terminal unit are electrically connected to each other. For example, in FIG. 1, the terminal 14A and the terminal 24A are electrically connected to each other, the terminal 14B and the terminal 24B are electrically connected to each other, the terminal 14C and the terminal 24C are electrically connected to each other, the terminal 14D and the terminal 24D are electrically connected to each other, the terminal 14E and the terminal 24E are electrically connected to each other, and the terminal 14F and the terminal 24F are electrically connected to each other.

Figure 3:
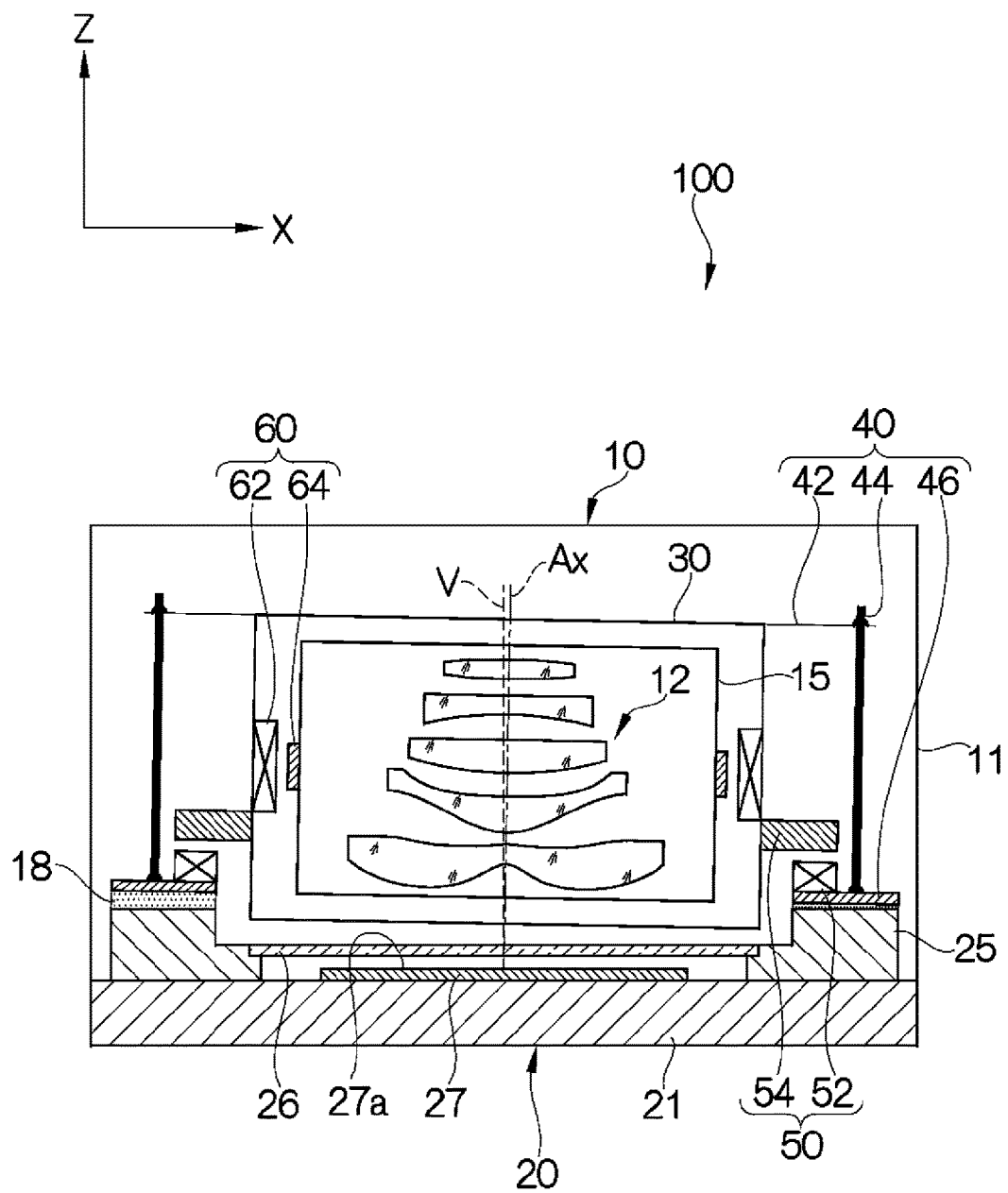
FIG. 3 is a cross-sectional view of the imaging module illustrated in FIG. 1 taken along line III-III.

FIG. 3 is a cross-sectional view of the imaging module 100 illustrated in FIG. 1 taken along line III-III. As illustrated in FIG. 3, the imaging device 27 is disposed on the substrate 21 and sealed with the base member 25, disposed on the substrate 21, and the cover glass piece 26, fitted to the base member 25.

The lens unit 10 includes a lens group 12, including multiple (five in the example illustrated in FIG. 3) lenses disposed above the cover glass piece 26, a tube-shaped lens barrel 15, which supports the lens group 12, a movable image-stabilizing unit 30, an elastic support unit 40, which supports the movable image-stabilizing unit 30 such that the movable image-stabilizing unit 30 is movable in directions perpendicular to the optical axis Ax of the lens group 12 and tiltable around axes perpendicular to the optical axis Ax, an OIS mechanism 50, which moves the movable image-stabilizing unit 30 in directions perpendicular to the optical axis, and a focus adjusting mechanism 60, which moves the lens barrel 15 in the direction of the optical axis.

The movable image-stabilizing unit 30 contains the lens barrel 15 and has, as described below in detail, a magnetic member such as a magnet. Although not illustrated, an opening that allows object light to pass through the lens group 12 is formed in the upper surface of the movable image-stabilizing unit 30.

The elastic support unit 40 includes a leaf spring 42, extending sideward of the movable image-stabilizing unit 30, four suspension wires 44, each having one end portion fixed to the leaf spring 42 and the other end portion fixed to a portion near the base member 25, and a wire fixing unit 46, to which the other end portion of each suspension wire 44 is fixed and which is fixed onto the base member 25 with adhesion.

The OIS mechanism 50 has OIS driving coils 52, fixed to the base member 25 side (stationary side), and OIS driving magnets 54, fixed to a portion near the movable image-stabilizing unit 30 (movable side). Together with an AF magnet 64, described below, the OIS driving magnets 54 correspond to magnetic members of the present invention. The lens unit 10 may be provided with other magnetic members.

FIG. 3 illustrates a pair of OIS driving coils 52 and a pair of OIS driving magnets 54 opposing in an X direction (lateral direction in the drawing) of an three-axis orthogonal coordinate system in which the direction perpendicular to the imaging surface 27a of the imaging device 27 is defined as the Z-axis. However, a pair of OIS driving coils and a pair of OIS driving magnets are also disposed so as to oppose in the Y direction (in the direction perpendicular to the plane of the drawing). Image stabilization can be performed by driving the OIS driving coils in the X direction and the Y direction and moving the movable image-stabilizing unit 30 in the directions perpendicular (including substantially perpendicular) to the optical axis Ax.

The focus adjusting mechanism 60 includes a voice coil motor having an autofocus (AF) coil 62, disposed inside the movable image-stabilizing unit 30, and an AF magnet 64, disposed around the lens barrel 15. The focus adjusting mechanism 60 can perform focus adjustment by driving the voice coil motor and moving the lens barrel 15 in the optical axis direction.

The OIS mechanism 50 and the focus adjusting mechanism 60 each include Hall devices serving as position sensors that detect the position of the lens group 12 (lens barrel 15) in the XYZ directions.

By fixing the wire fixing unit 46 of the lens unit 10 to the base member 25 on the imaging device unit 20 with an adhesive 18 (here, an ultraviolet cure adhesive as an example), the lens unit 10 and the imaging device unit 20 are fixed to each other, so that the imaging module 100 is manufactured. At this time, the lens unit 10 and the imaging device unit 20 are fixed to each other with adhesion in the state where the lens group 12 is tilted in advance in a direction opposite to the direction of tilt in consideration of a tilt of the movable image-stabilizing unit 30 caused as a result of an application of a magnetic field from a magnetic-field generating unit in the state where the imaging module 100 is installed in an electronic device including the magnetic-field generating unit, that is, the lens unit 10 and the imaging device unit 20 are fixed to each other in a reference position in which the lens group 12 is fixed in a state of being applied with a magnetic field.

Here, the reference position is a position in which the optical axis Ax is parallel to dotted line V perpendicular to the imaging surface 27a in the drawing in the case where the lens group 12 is in a perfect state free from defects including manufacturing errors such as formation or assembly errors or distortion. A reference position of the lens group 12 that is in an imperfect state is a position of an approximate image formation surface calculated by an imaging-module manufacturing device 200, described below, in which the optical axis Ax is usually non-parallel to dotted line V. In this description, for ease of understanding the content of the invention, the lens group 12 is described as being in a perfect state.

<Configuration of Electrical Connection Between OIS Mechanism and Focus Adjusting Mechanism>

Figure 4:
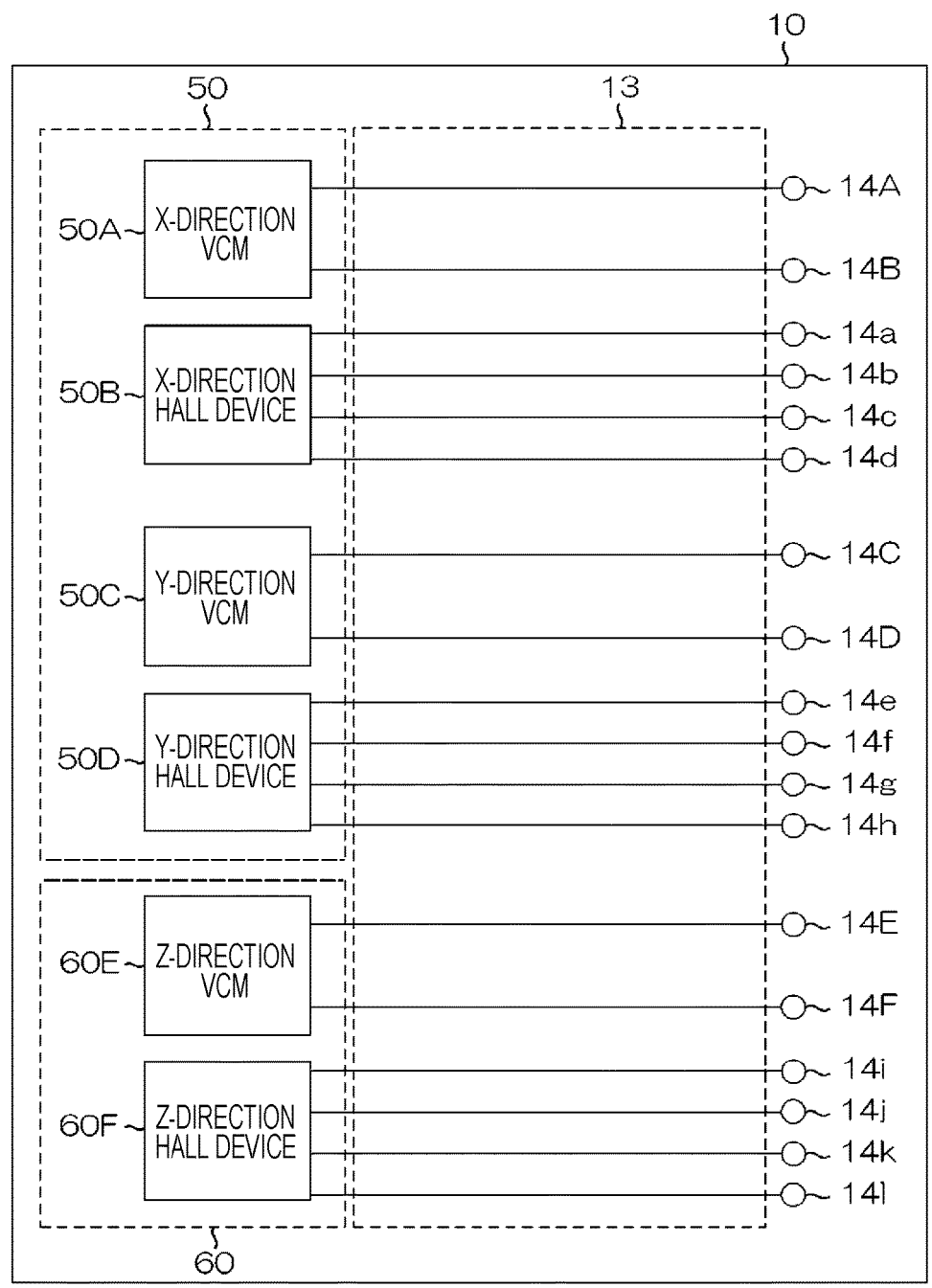
FIG. 4 is a block diagram illustrating an electric connection configuration of an OIS mechanism and a focus adjusting mechanism.

FIG. 4 is a block diagram illustrating a configuration of electrical connection between the OIS mechanism 50 and the focus adjusting mechanism 60 illustrated in FIG. 3.

As illustrated in FIG. 4, the OIS mechanism 50 includes a voice coil motor 50A (the OIS driving coils 52 and the OIS driving magnets 54 illustrated in FIG. 3, hereinafter abbreviated to an X-direction VCM 50A), which moves the movable image-stabilizing unit 30 in the X direction, an X-direction Hall device 50B, which detects the position of the movable image-stabilizing unit 30 in the X direction, a voice coil motor 50C (hereinafter abbreviated to a Y-direction VCM 50C), which moves the movable image-stabilizing unit 30 in the Y direction, and a Y-direction Hall device 50D, which detects the position of the movable image-stabilizing unit 30 in the Y direction.

The focus adjusting mechanism 60 includes a voice coil motor 60E (the AF coils 62 and the AF magnets 64 illustrated in FIG. 3, hereinafter abbreviated to a Z-direction VCM 60E), which moves the lens group 12 (lens barrel 15) in the optical axis direction relative to the movable image-stabilizing unit 30, and a Z-direction Hall device 60F, which detects the position of the lens barrel 15 in the Z direction.

The X-direction VCM 50A includes two terminals, which are electrically connected to a terminal 14A and a terminal 14B, respectively, by way of wires formed at the flexible board 13.

The X-direction Hall device 50B includes four terminals, which are electrically connected to a terminal 14a, a terminal 14b, a terminal 14c, and a terminal 14d, respectively, by way of wires formed at the flexible board 13.

The Y-direction VCM 50C includes two terminals, which are electrically connected to a terminal 14C and terminal 14D, respectively, by way of wires formed at the flexible board 13.

The Y-direction Hall device 50D includes four terminals, which are electrically connected to a terminal 14e, a terminal 14f, a terminal 14g, and a terminal 14h, respectively, by way of wires formed at the flexible board 13.

The Z-direction VCM 60E includes two terminals, which are electrically connected to a terminal 14E and a terminal 14F, respectively, by way of wires formed at the flexible board 13.

The Z-direction Hall device 60F includes four terminals, which are electrically connected to a terminal 14i, a terminal 14j, a terminal 14k, and a terminal 14l, respectively, by way of wires formed at the flexible board 13.

In this manner, the terminals of the lens-unit terminal unit 14 function as electrical connection portions electrically connected to the OIS mechanism 50 and the focus adjusting mechanism 60 of the lens unit 10. Here, the number of terminals required for each Hall device of the OIS mechanism 50 and the focus adjusting mechanism 60 is taken as an example and not limited to the above-described configuration.

<Configuration of Imaging-Module Manufacturing Device According to First Embodiment>

Figure 5:
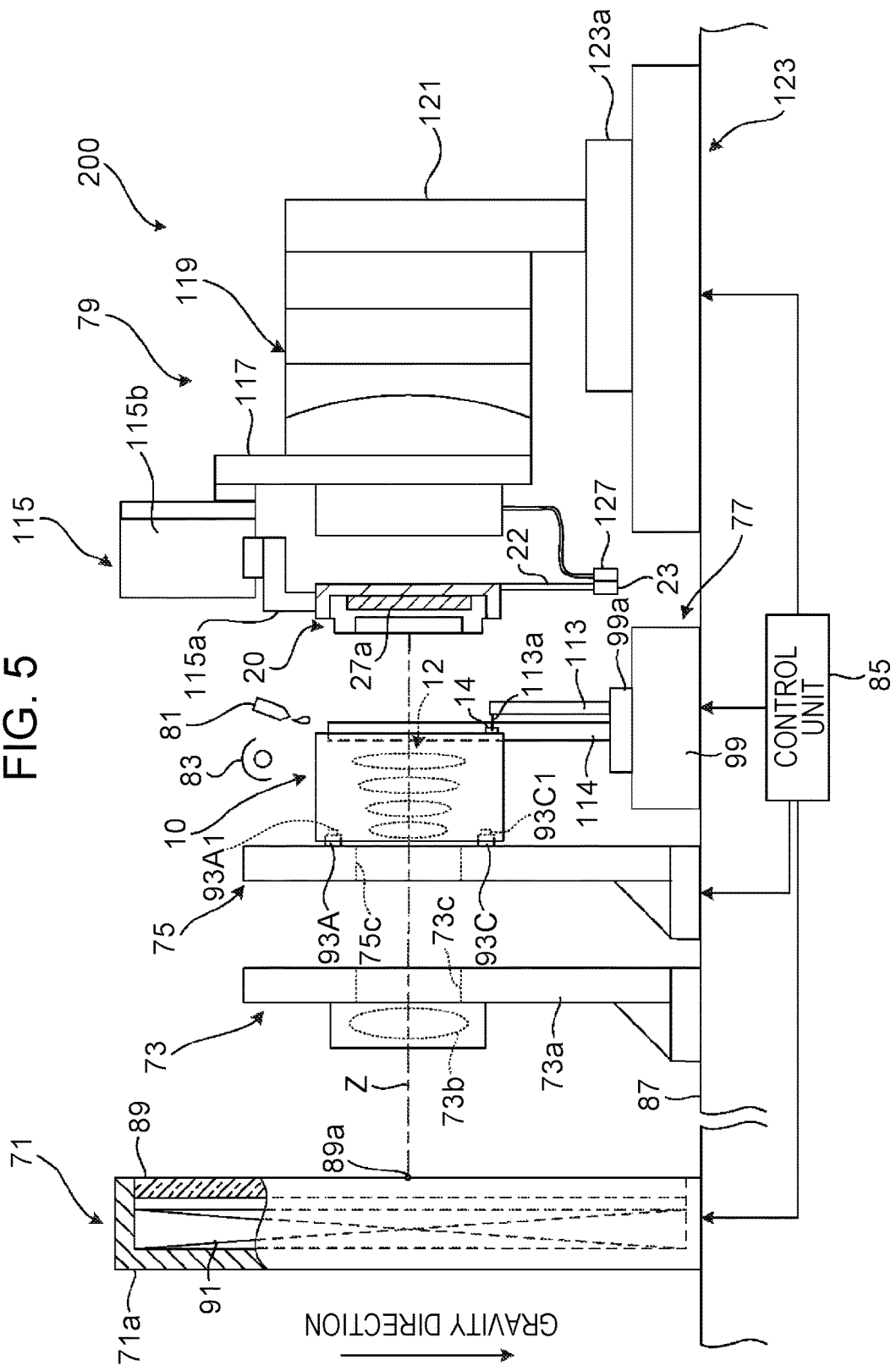
FIG. 5 is a schematic diagram of an imaging-module manufacturing device according to a first embodiment.

FIG. 5 illustrates a configuration corresponding to an imaging-module manufacturing device according to the present invention and is a schematic diagram of the imaging-module manufacturing device 200 that manufactures the imaging module 100 as a result of fixing the lens unit 10 and the imaging device unit 20 to each other. The imaging-module manufacturing device 200 adjusts the position and the tilt of the imaging device unit 20 relative to the lens unit 10 and, after this adjustment, fixes the imaging device unit 20 to the lens unit 10 to complete the imaging module 100.

The imaging-module manufacturing device 200 includes a measurement-chart installation portion 71, a condensing unit 73, a lens positioning plate 75, a lens-unit holding portion 77, an imaging-device-unit holding portion 79, an adhesive supplying portion 81, an ultraviolet lamp 83, serving as a light source, and a control unit 85, which controls these components. The measurement-chart installation portion 71, the condensing unit 73, the lens positioning plate 75, the lens-unit holding portion 77, and the imaging-device-unit holding portion 79 are unidirectionally arranged on a shaft 87 perpendicular to the direction of gravity and perpendicular to a measurement chart 89, described below.

The measurement-chart installation portion 71 has a box-shaped housing 71a, a measurement chart 89, fixed into the housing 71a, and a light source 91, which is installed in the housing 71a and illuminates the measurement chart 89 with parallel rays from the back surface of the measurement chart 89. The measurement chart 89 is made of, for example, a plastic board having light diffusibility. A chart surface of the measurement chart 89 is parallel to the direction of gravity. The measurement chart 89 may be rendered replaceable with another one by being rendered removable.

In the description described above, a perpendicular line that is perpendicular to the chart surface of the measurement chart 89 (perpendicular line parallel to the shaft 87) and that passes a chart surface center 89a is defined as a Z-axis and the two axes perpendicular to the Z-axis are defined as a horizontal X-axis and a vertical Y-axis (hereinafter abbreviated to an X-axis and a Y-axis as appropriate, see FIG. 6).

Figure 6:
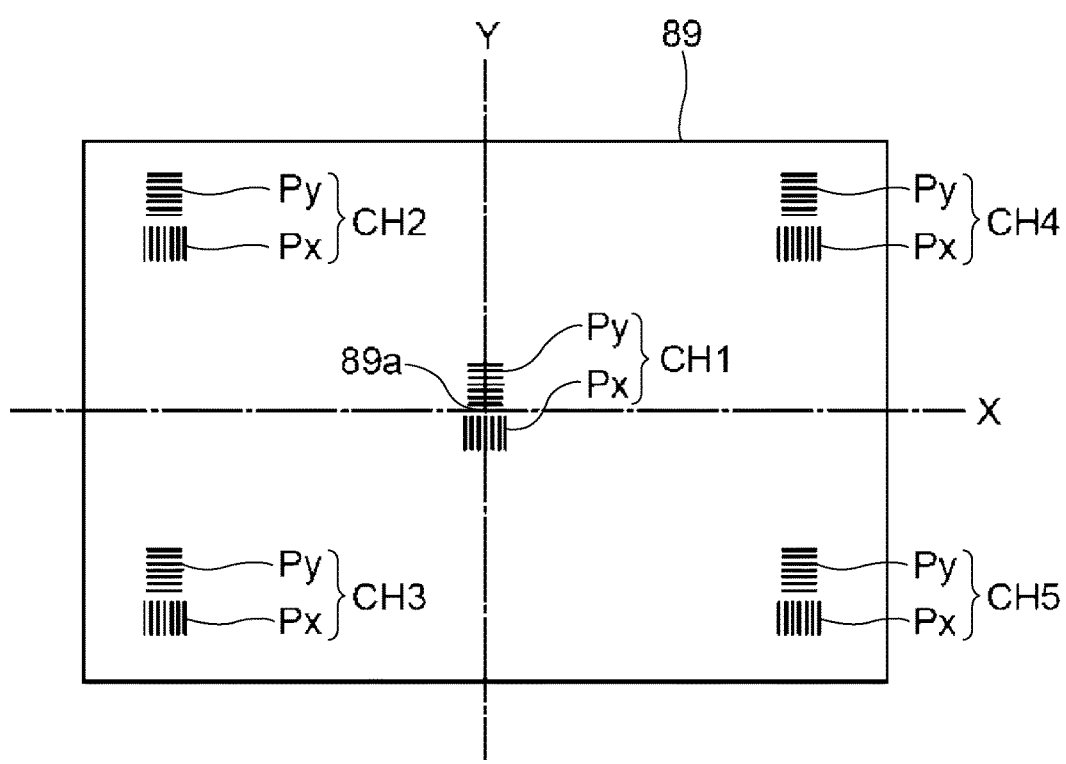
FIG. 6 is a front view of a measurement chart of the imaging-module manufacturing device illustrated in FIG. 5.

FIG. 6 is a chart surface of the measurement chart 89. The measurement chart 89 is rectangular. Multiple chart images CH1, CH2, CH3, CH4, and CH5 are printed on the chart surface on which chart patterns are provided.

All the multiple chart images are the same image, which is a so-called ladder-shaped chart pattern in which black lines are arranged at a predetermined interval. Each chart image includes a horizontal chart image Px, in which the lines are arranged in the horizontal direction of the image, and a vertical chart image Py, in which the lines are arranged in the vertical direction of the image.

Referring back to FIG. 5, the condensing unit 73 is disposed on the Z-axis so as to face the measurement-chart installation portion 71.

The condensing unit 73 includes a bracket 73a, fixed to the shaft 87, and a condensing lens 73b. The condensing lens 73b condenses light emitted from the measurement-chart installation portion 71 and causes the condensed light to be incident on the lens positioning plate 75 through an opening 73c formed in the bracket 73a.

The lens positioning plate 75 and the lens-unit holding portion 77 hold the lens unit 10 at a position on the Z-axis between the measurement-chart installation portion 71 and the imaging-device-unit holding portion 79. In other words, the lens positioning plate 75 constitutes, together with the lens-unit holding portion 77, a lens-unit holding portion according to the present invention.

The lens positioning plate 75 is formed so as to have rigidity and has an opening 75c that allows light condensed by the condensing unit 73 to pass through an opening 75c. The lens positioning plate 75 is disposed on the Z-axis so as to face the condensing unit 73.

Figure 7:
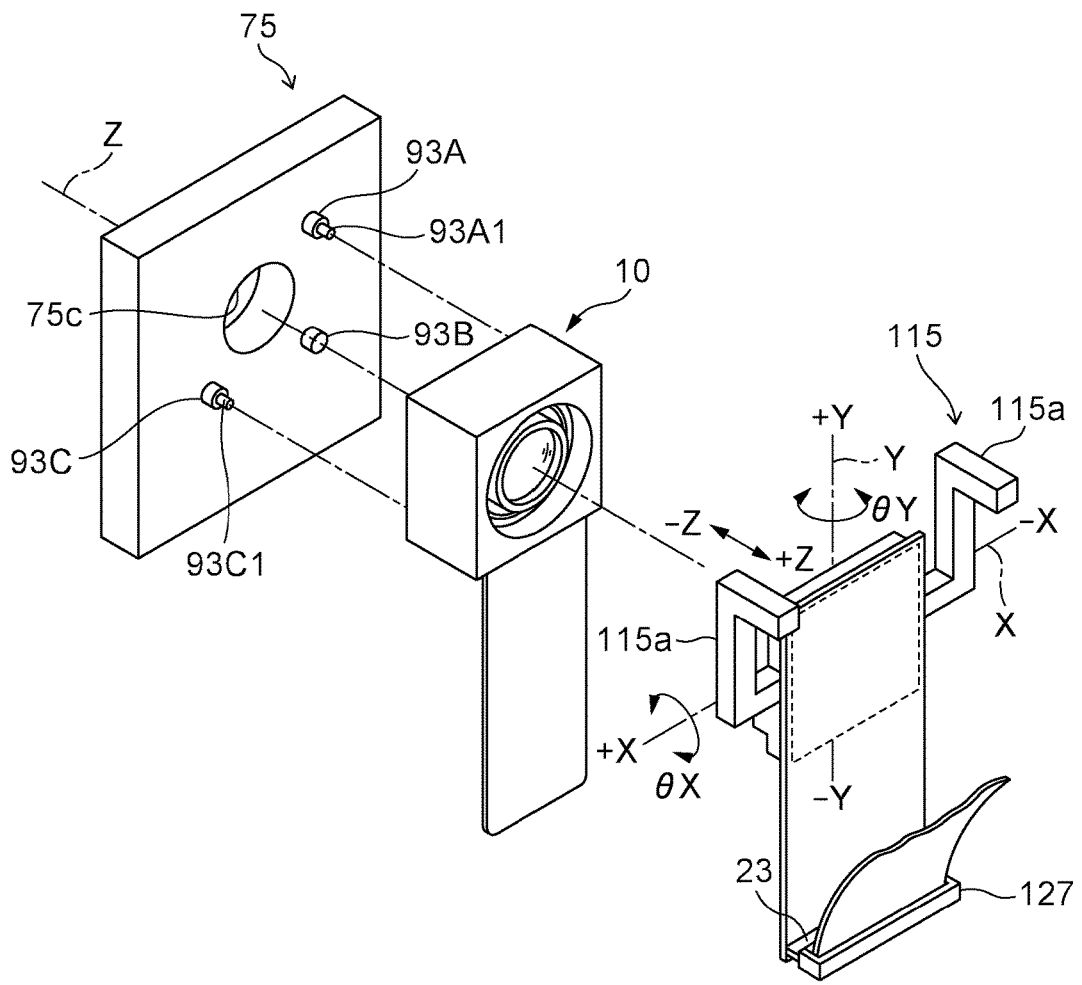
FIG. 7 is an illustration illustrating holding states of the lens unit and the imaging device unit in the imaging-module manufacturing device.

FIG. 7 illustrates how the imaging-module manufacturing device 200 holds the lens unit 10 and the imaging device unit 20.

As illustrated in FIG. 7, three contact pins 93A, 93B, and 93C are disposed around the opening 75c on the surface of the lens positioning plate 75 facing the lens-unit holding portion 77.

The contact pins 93A, 93B, and 93C receive the recessed portions 95A, 95B, and 95C of the lens unit 10 illustrated in FIG. 1 and insertion pins 93A1 and 93C1 are inserted into the recessed portions 95A1 and 95C1, so that the position of the lens unit 10 is fixed. In this manner, in the state where the position of the lens unit 10 is fixed, the Z-axis coincides with the optical axis Ax of the lens group 12.

Referring back to FIG. 5, the lens-unit holding portion 77 includes a first slide stage 99, movable in the Z direction, and a probe unit 113 and a holding plate 114, disposed on a stage portion 99a of the first slide stage 99.

The first slide stage 99 is an electric precision stage. The first slide stage 99 rotates a ball screw using a rotation of a motor, not illustrated, to move the stage portion 99a, engaged with the ball screw, in the Z direction. The first slide stage 99 is controlled by the control unit 85.

The holding plate 114 has a configuration that holds the lens unit 10 such that the upper surface 11a of the housing 11 faces the measurement-chart installation portion 71 on the Z-axis. The lens unit 10 is held by the imaging-module manufacturing device 200 as a result of moving the stage portion 99a in the Z direction and pressing the holding plate 114 against the lens unit 10 whose position is fixed by the lens positioning plate 75.

The probe unit 113 includes multiple probes 113a (only one probe is illustrated in FIG. 5). In the state where the first slide stage 99 is moved in the Z direction and the holding plate 114 is pressed against the lens unit 10, contactors of the probes 113a come into contact with the terminals 14A to 14F of the lens unit 10.

The probe unit 113 passes a current to the terminals 14A to 14F through the probes 113a to drive the X-direction VCM 50A, the Y-direction VCM 50C, and the Z-direction VCM 60E.

Each probe 113a included in the probe unit 113 is a so-called spring probe and includes a contactor that comes into contact with a contact-target portion, a connector that is electrically connected to a circuit board in the probe unit 113, and an elastic body, such as a spring, that is disposed between the contactor and the connector and urges the contactor. The contactor of each probe 113a is made of, for example, a nonmagnetic material. The circuit board in the probe unit 113 is electrically connected to a lens driver 145, described below.

The imaging-device-unit holding portion 79 has a configuration that holds the imaging device unit 20 on the Z-axis. The imaging-device-unit holding portion 79 is capable of changing the position of the imaging device unit 20 in the Z direction and the tilt of the imaging device unit 20 under the control of the control unit 85. Here, the tilt of the imaging device unit 20 represents the tilt of the imaging surface 27a of the imaging device 27 with respect to a flat plane perpendicular to the Z-axis.

The imaging-device-unit holding portion 79 has a chuck hand 115, which holds the imaging device unit 20 such that the imaging surface 27a faces the measurement-chart installation portion 71 on the Z-axis, a biaxial rotation stage 119, which holds a substantially crank-shaped bracket 117 to which the chuck hand 115 is attached and adjusts the tilt around two axes (X-axis and Y-axis) perpendicular to the Z-axis, and a second slide stage 123, which holds a bracket 121 to which the biaxial rotation stage 119 is attached and moves the bracket 121 in the Z direction.

As illustrated in FIG. 7, the chuck hand 115 includes a pair of clamping members 115a, bent so as to have a substantially crank shape, and an actuator 115b (see FIG. 5), which moves these clamping members 115a in the X direction perpendicular to the Z-axis. The clamping members 115a hold an outer frame of the imaging device unit 20 therebetween to hold the imaging device unit 20.

Referring back to FIG. 5, the chuck hand 115 fixes the position of the imaging device unit 20 held between the clamping members 115a such that the optical axis Ax of the lens unit 10 held by the lens positioning plate 75 and the lens-unit holding portion 77 and the center position of the imaging surface 27a coincide with each other.

The chuck hand 115 fixes the position of the imaging device unit 20 held between the clamping members 115a such that each terminal of the imaging-device-unit terminal unit 24 of the imaging device unit 20 overlaps the corresponding terminal of the lens-unit terminal unit 14 of the held lens unit 10 when viewed in the Z direction.

The biaxial rotation stage 119 is an electric biaxial gonioscopic stage. The biaxial rotation stage 119 tilts the imaging device unit 20 in a ΘX direction around the X-axis and a ΘY direction around the Y-axis (see FIG. 7), perpendicular to the Z-axis and the X-axis, using rotations of two motors, not illustrated, while the center position of the imaging surface 27a is used as a rotation center. Thus, when the imaging device unit 20 is tilted in each direction, the positional relationship between the center position of the imaging surface 27a and the Z-axis is prevented from being changed.

The second slide stage 123 is an electric precision stage. The second slide stage 123 rotates a ball screw using a rotation of a motor, not illustrated, to move a stage portion 123a, engaged with the ball screw, in the Z direction. The bracket 121 is fixed to the stage portion 123a.

A connector cable 127 connected to the external connection terminal unit 23 disposed at the tip of the flexible board 22 of the imaging device unit 20 is attached to the biaxial rotation stage 119. This connector cable 127 inputs driving signals of the imaging device 27 or outputs image-capturing image signals output from the imaging device 27.

The adhesive supplying portion 81 and the ultraviolet lamp 83 form a unit-fixing portion of the present invention that fixes the lens unit 10 and the imaging device unit 20 together.

The adhesive supplying portion 81 supplies the above-described ultraviolet cure adhesive 18, which cures with light, to a gap between the lens unit 10 and the imaging device unit 20 after the position and the tilt of the imaging device unit 20 relative to the lens unit 10 are adjusted.

The ultraviolet lamp 83 cures the adhesive by illuminating the ultraviolet curable adhesive 18 supplied to the gap with ultraviolet rays. Besides the ultraviolet cure adhesive, other adhesives such as an instant adhesive, a thermosetting adhesive, or an air-setting adhesive are also usable as the adhesive 18.

Figure 8:
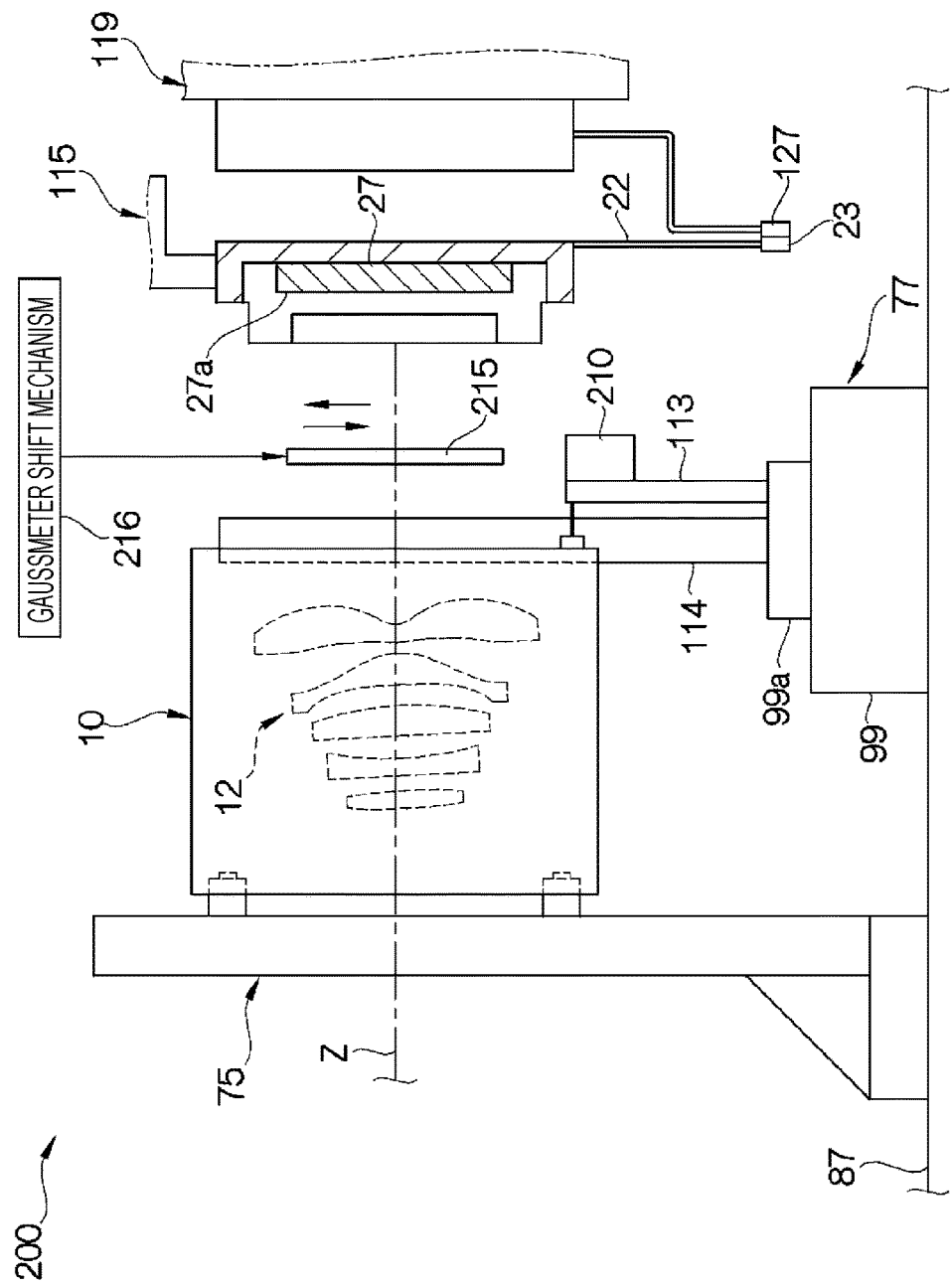
FIG. 8 is a partially enlarged view of the imaging-module manufacturing device and illustrates an electromagnet, a gaussmeter, and a gaussmeter shift mechanism.

FIG. 8 is a partially enlarged view of the imaging-module manufacturing device 200 illustrated in FIG. 5. The imaging-module manufacturing device 200 includes, beside the components described above, an electromagnet 210, a gaussmeter 215, and a gaussmeter shift mechanism 216.

The electromagnet 210 corresponds to a magnetic-field applying portion of the present invention. The electromagnet 210 includes, for example, a core formed of a magnetic material and a coil wound around the core. The electromagnet 210 produces a magnetic field (magnetic force) by supplying a current to the coil. The magnitude (intensity) of the magnetic field produced by the electromagnet 210 depends on the value of the electric current supplied to the coil. The electromagnet 210 applies a magnetic field to the movable image-stabilizing unit 30 of the lens unit 10 held by, for example, the lens-unit holding portion 77 under the control of the control unit 85.

Figure 9:
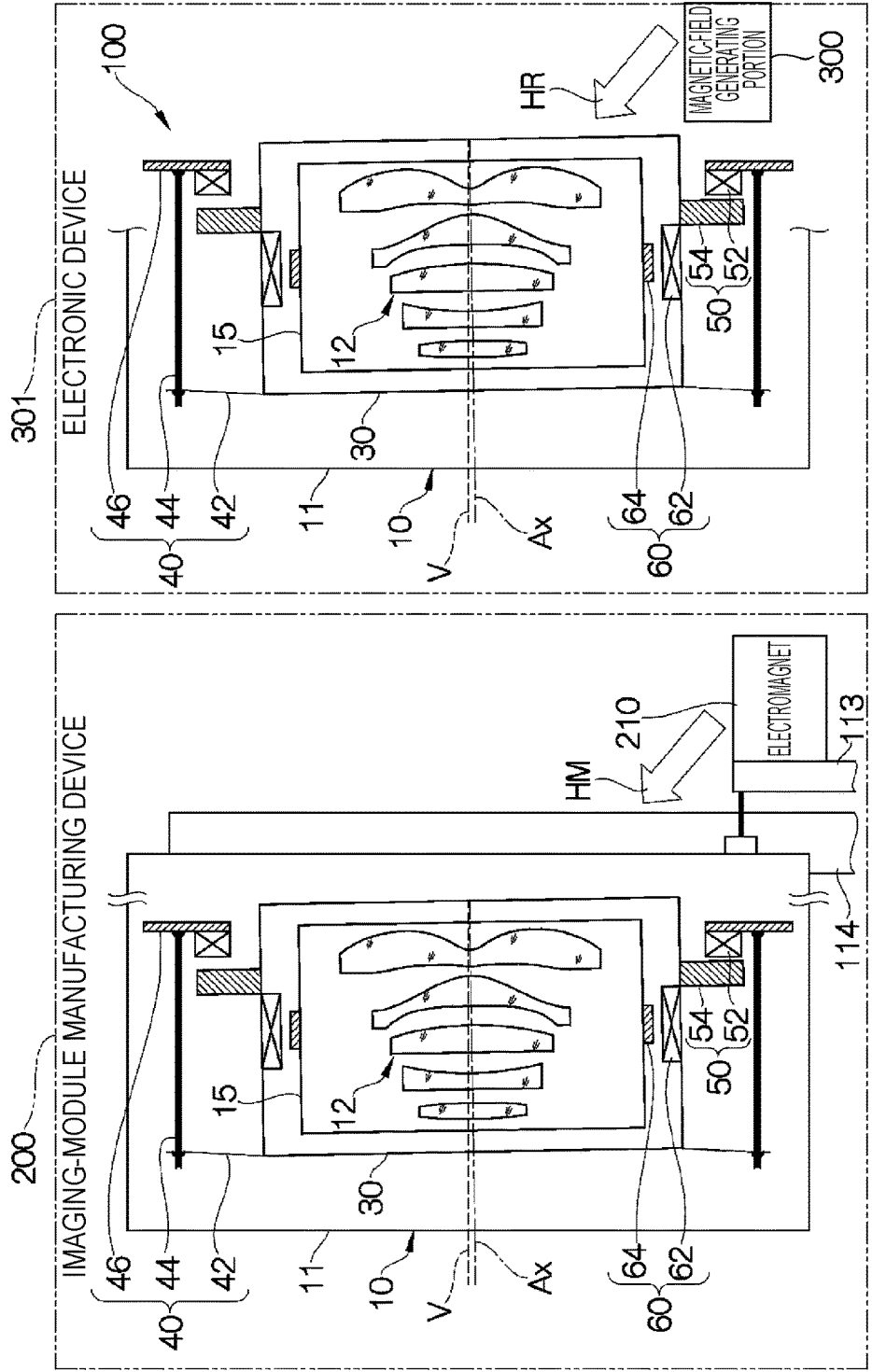
FIGS. 9A and 9B are illustrations illustrating the magnitude of a magnetic field applied to the lens module (movable image-stabilizing unit) from the electromagnet.

FIG. 9A illustrates the lens unit 10 in the middle of being manufactured by the imaging-module manufacturing device and FIG. 9B illustrates the lens unit 10 in actual operation conditions installed in an electronic device 301 having a magnetic-field generating unit 300. As illustrated in FIGS. 9A and 9B, a magnetic field (indicated with arrow "HM" in FIG. 9A) applied from the electromagnet 210 to the movable image-stabilizing unit 30 of the lens unit 10 is adjusted to have a magnitude equal to the magnitude of the magnetic field (indicated with arrow "HR" in FIG. 9B) applied from the magnetic-field generating unit 300 to the movable image-stabilizing unit 30 of the lens unit 10 in actual operation conditions installed in the electronic device 301 including the magnetic-field generating unit 300. The term "equal" here means that the intensity of the magnetic field applied from the electromagnet 210, if the intensity can be set stepwise, is within the range set stepwise. For example, when the intensity of the magnetic field can be input up to the first decimal place at the time of setting, the intensity is regarded as being equal if the intensity up to that number of digits is the same. Hereinbelow, a magnetic field applied from the magnetic-field generating unit 300 to the movable image-stabilizing unit 30 of the lens unit 10 in actual operation conditions is abbreviated to an "actual-operation-condition magnetic field".

The position in the imaging-module manufacturing device 200 at which the electromagnet 210 is attached is adjusted so that the direction of the actual-operation-condition magnetic field applied to the movable image-stabilizing unit 30 and the direction of the magnetic field applied from the electromagnet 210 to the movable image-stabilizing unit 30 coincide (including substantially coincide) with each other. For example, the positional relationship between the lens unit 10 and the electromagnet 210 inside the imaging-module manufacturing device 200 is adjusted so as to coincide (including substantially coincide) with the positional relationship between the magnetic-field generating unit 300 and the lens unit 10 in the case where the imaging module 100 is installed in the electronic device 301. Alternatively, the position in the imaging-module manufacturing device 200 at which the electromagnet 210 is attached may be adjusted so that the direction of the actual-operation-condition magnetic field applied to the movable image-stabilizing unit 30 and the direction of the magnetic field applied from the electromagnet 210 to the movable image-stabilizing unit 30 coincide with each other by actually measuring or calculating with simulation the directions of both magnetic fields.

By thus adjusting the magnitude and the direction of the magnetic field applied from the electromagnet 210 to the movable image-stabilizing unit 30, the movable image-stabilizing unit 30 in the imaging-module manufacturing device 200 can be tilted in the same manner as in the actual operation conditions. That is to say, in the imaging-module manufacturing device 200, the direction of tilt and the amount of tilt in which the movable image-stabilizing unit 30 is tilted with an application of the magnetic field from the electromagnet 210 can be rendered equal to (including substantially equal to) the direction of tilt and the amount of tilt in which the movable image-stabilizing unit 30 is tilted due to an application of the actual-operation-condition magnetic field.

Referring back to FIG. 8, the gaussmeter 215 corresponds to a magnetic-field-intensity measuring portion of the present invention and measures the intensity of a magnetic field applied from the electromagnet 210 to the movable image-stabilizing unit 30 of the lens unit 10 held by components such as the lens-unit holding portion 77. The intensity H (A/m) of the magnetic field and the magnetic flux density B (T) satisfy the relationship of $B=\mu H$ where $\mu$ denotes magnetic permeability. Thus, the measurement of the intensity of the magnetic field here includes the measurement of the magnetic flux density. On the basis of the measurement results of the gaussmeter 215, whether a magnetic field having a magnitude the same as that of the actual-operation-condition magnetic field is applied to the movable image-stabilizing unit 30 can be determined.

Under the control of the control unit 85, the gaussmeter shift mechanism 216 moves the gaussmeter 215 between a measurement position and a retract position. The measurement position is a position near the movable image-stabilizing unit 30 and at which the intensity of the magnetic field applied to the movable image-stabilizing unit 30 of the lens unit 10 can be measured. The wording "near the movable image-stabilizing unit 30" here represents within a space occupied by the lens unit 10 (movable image-stabilizing unit 30) when the lens unit 10 is installed in the imaging-module manufacturing device 200. Thus, the measurement position is within the space occupied by the movable image-stabilizing unit 30 when components such as the lens-unit holding portion 77 hold the lens unit 10. Thus, the intensity of the magnetic field applied to the movable image-stabilizing unit 30 of the lens unit 10 can be accurately measured.

The retract position is a position away from the measurement position that is near the lens unit 10 (movable image-stabilizing unit 30) and at which adjustments of the position and the tilt of the imaging device unit 20 relative to the lens unit 10 are not disturbed.

<Electrical Configuration of Imaging-Module Manufacturing Device>

Figure 10:
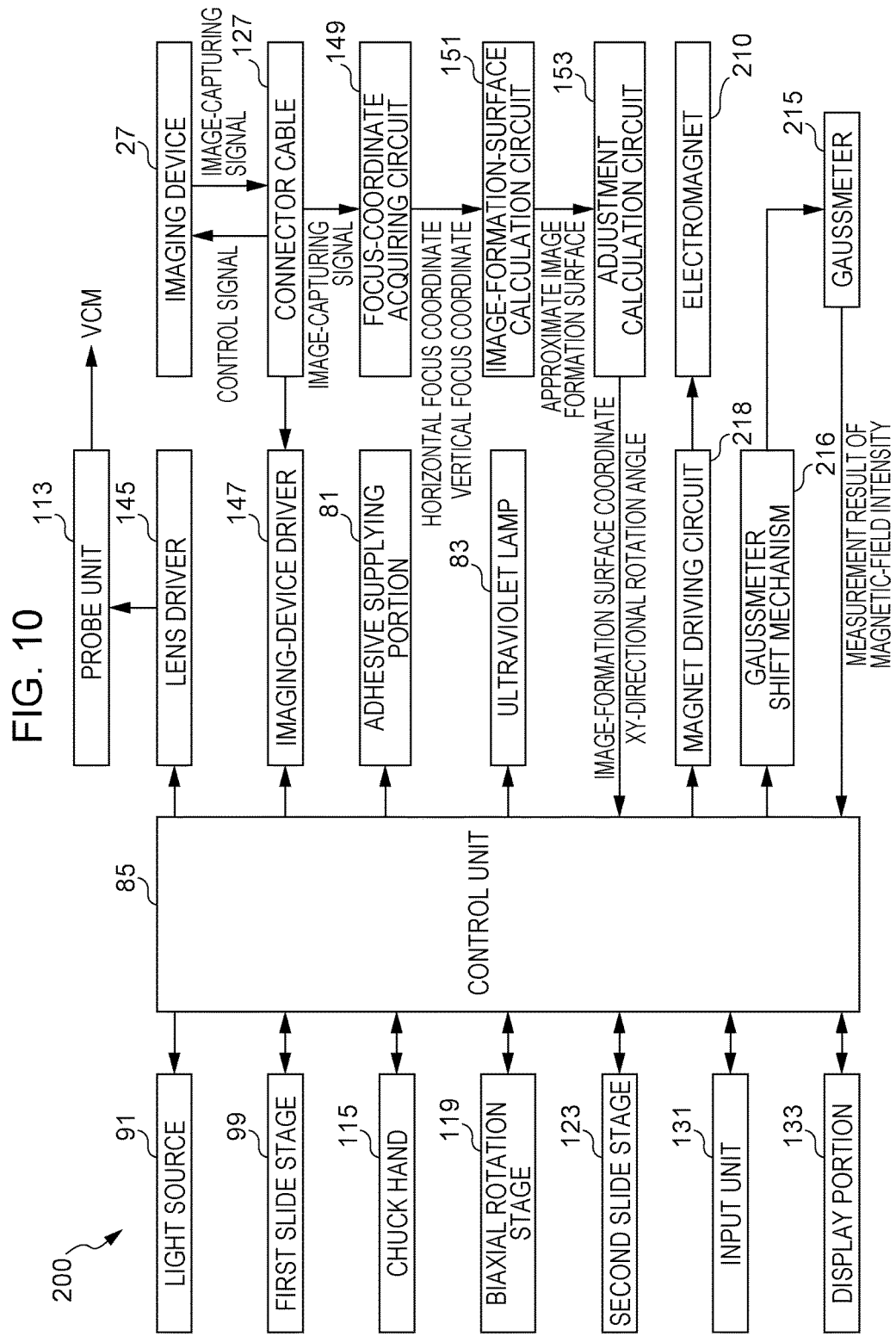
FIG. 10 is a block diagram of an electrical configuration of the imaging-module manufacturing device.

FIG. 10 is a block diagram of an electrical configuration of the imaging-module manufacturing device 200.

A control unit 85 is a microcomputer including, for example, a CPU, a ROM, and a RAM. The control unit 85 controls each component on the basis of a control program stored in the ROM. An input unit 131, such as a keyboard and a mouse through which various settings are made, and a display portion 133, which displays setting details, operation details, operation results, and the like, are also connected to the control unit 85.

The lens driver 145 is a driving circuit for driving the X-direction VCM 50A, the Y-direction VCM 50C, and the Z-direction VCM 60E. The lens driver 145 supplies driving currents to the X-direction VCM 50A, the Y-direction VCM 50C, and the Z-direction VCM 60E through the probe unit 113.

An imaging-device driver 147 is a driving circuit for driving the imaging device 27 and inputs driving signals to the imaging device 27 through the connector cable 127.

Although described in detail below, a focus-coordinate acquiring circuit 149 acquires focus coordinates, which are positions at which the degree of focus in the Z direction is high, for multiple imaging positions (positions corresponding to the chart images CH1, CH2, CH3, CH4, and CH5 of the measurement chart 89) set on the imaging surface 27a of the imaging device 27.

When the control unit 85 acquires focus coordinates for multiple imaging positions, the control unit 85 controls the second slide stage 123 and sequentially moves the imaging device unit 20 to multiple measurement positions (Z0, Z1, Z2, ...) discretely determined in advance on the Z-axis. Thus, the relative position of the measurement-chart installation portion 71, the lens-unit holding portion 77, and the imaging-device-unit holding portion 79 on the shaft 87 (Z-axis) is changed.

The control unit 85 controls the imaging-device driver 147 and causes the imaging device 27 to capture multiple chart images CH1, CH2, CH3, CH4, and CH5 of the measurement chart 89, imaged by the lens group 12 at the respective measurement positions (Z0, Z1, Z2, ...). In other words, the control unit 85, the second slide stage 123, and the imaging-device driver 147 constitute a control unit of the present invention.

At this time, the control unit 85 controls a magnet driving circuit 218 so that power is supplied to the electromagnet 210 and a magnetic field is applied from the electromagnet 210 to the movable image-stabilizing unit 30 of the lens unit 10. Thus, in the state where the magnetic field is applied from the electromagnet 210 to the movable image-stabilizing unit 30, the imaging device unit 20 is sequentially moved to multiple measurement positions (Z0, Z1, Z2, ...) determined on the Z direction and images of the measurement chart 89 are captured by the imaging device 27 at each measurement position. In other words, in the state where the movable image-stabilizing unit 30 in the imaging-module manufacturing device 200 is tilted in the same manner as in the case of the actual operation conditions, the imaging device unit 20 is moved and images of the measurement chart 89 are captured.

Before the control unit 85 starts moving the imaging device unit 20 and capturing images of the measurement chart 89, the control unit 85 controls the gaussmeter shift mechanism 216 to move the gaussmeter 215 to a measurement position. Then, the control unit 85 determines, on the basis of the measurement results of the intensity of the magnetic field input from the gaussmeter 215, whether the magnitude of the magnetic field applied from the electromagnet 210 to the movable image-stabilizing unit 30 is the same as the magnitude of the actual-operation-condition magnetic field. Here, imaging modules 100 of the same model installed in the electronic devices 301 of the same model have basically the same intensity of the actual-operation-condition magnetic field. Thus, the intensity for each combination of the electronic device 301 of a specific model and the imaging module 100 of a specific model is obtained in advance.

When the magnitude of the magnetic field applied to the movable image-stabilizing unit 30 is different from the magnitude of the actual-operation-condition magnetic field, the control unit 85 controls the magnet driving circuit 218 to increase or decrease the electric current supplied to the electromagnet 210, so that the magnetic field applied to the movable image-stabilizing unit 30 is adjusted to have the same magnitude as the magnitude of the actual-operation-condition magnetic field. Thus, the imaging device unit 20 can be moved and images of the measurement chart 89 can be captured in the state where the movable image-stabilizing unit 30 in the imaging-module manufacturing device 200 is tilted in the manner as in the case of the actual operation conditions.

The focus-coordinate acquiring circuit 149 picks up pixel signals corresponding to the multiple imaging positions from the image-capturing signals input through the connector cable 127 and calculates individual focus evaluation values on the multiple imaging positions from the pixel signals. The measurement position at which a predetermined focus evaluation value is obtained for each imaging position is determined as a focus coordinate on the Z-axis.

A value expressing the resolution of the lens group 12, for example, a contrast transfer function value (contrast transfer function: hereinafter abbreviated to a CTF value) may be used as a focus evaluation value. A CTF value is a value representing the contrast of an image in relation to the spatial frequency. When the CTF value is high, the degree of focus is regarded as being high.

The focus-coordinate acquiring circuit 149 calculates CTF values in multiple directions set on the XY planes of coordinates at each of multiple measurement positions (Z0, Z1, Z2, ...) set on the Z-axis at each of the multiple imaging positions.

The directions for which a CTF value is calculated are, for example, a horizontal direction (X direction), which is a lateral direction of the imaging surface 27a, and a vertical direction (Y direction), perpendicular to the horizontal direction. An X-CTF value and a Y-CTF value, which are CTF values of the respective directions, are calculated.

The focus-coordinate acquiring circuit 149 acquires coordinates on the Z-axis (Zp1, Zp2, Zp3, Zp4, and Zp5) at measurement positions at which the X-CTF value is maximum for multiple imaging positions corresponding to the chart images CH1, CH2, CH3, CH4, and CH5 as horizontal focus coordinates. Similarly, the focus-coordinate acquiring circuit 149 acquires coordinates on the Z-axis at measurement positions at which the Y-CTF value is maximum as vertical focus coordinates.

Horizontal focus coordinates and vertical focus coordinates at the imaging positions are input to an image-formation-surface calculation circuit 151 from the focus-coordinate acquiring circuit 149.

The image-formation-surface calculation circuit 151 develops, in a three dimensional coordinate system in which the XY planes of coordinates and the Z-axis are combined, the XY coordinates at each imaging position obtained when the imaging surface 27a is caused to correspond to the XY planes of coordinates and multiple evaluation points expressed by a combination of the horizontal focus coordinate and the vertical focus coordinate on the Z-axis obtained for each imaging position. The image-formation-surface calculation circuit 151 calculates, on the basis of the relative position of these evaluation points, an approximate image formation surface expressed as one flat plane in the three dimensional coordinate system. This approximate image formation surface represents a reference position of the lens group 12 described above.

Information of the approximate image formation surface is input from the image-formation-surface calculation circuit 151 to an adjustment calculation circuit 153. The adjustment calculation circuit 153 calculates image-formation surface coordinates on the Z-axis, which are a point of intersection of the approximate image formation surface and the Z-axis, and a XY-directional rotation angle, which is a tilt of the approximate image formation surface around the X-axis and the Y-axis with respect to the XY planes of coordinates. The XY-directional rotation angle is a barometer indicating the direction of tilt in which and the amount of tilt by which tilt of the lens group 12 is adjusted relative to the imaging device 27 with respect to the approximate image formation surface (reference position) and corresponds to the compensation amount of the present invention. The adjustment calculation circuit 153 outputs the image-formation surface coordinates and the XY-directional rotation angle to the control unit 85.

The control unit 85 drives the biaxial rotation stage 119 and the second slide stage 123 of the imaging-device-unit holding portion 79 on the basis of the image-formation surface coordinates and the XY-directional rotation angle input from the adjustment calculation circuit 153 and adjusts the position of the imaging device unit 20 in the Z direction and the tilt of the imaging device unit 20. In other words, the control unit 85 and the biaxial rotation stage 119 function as an adjustment portion of the present invention.

<Process Flow of Manufacturing Imaging Module>

Figure 11:
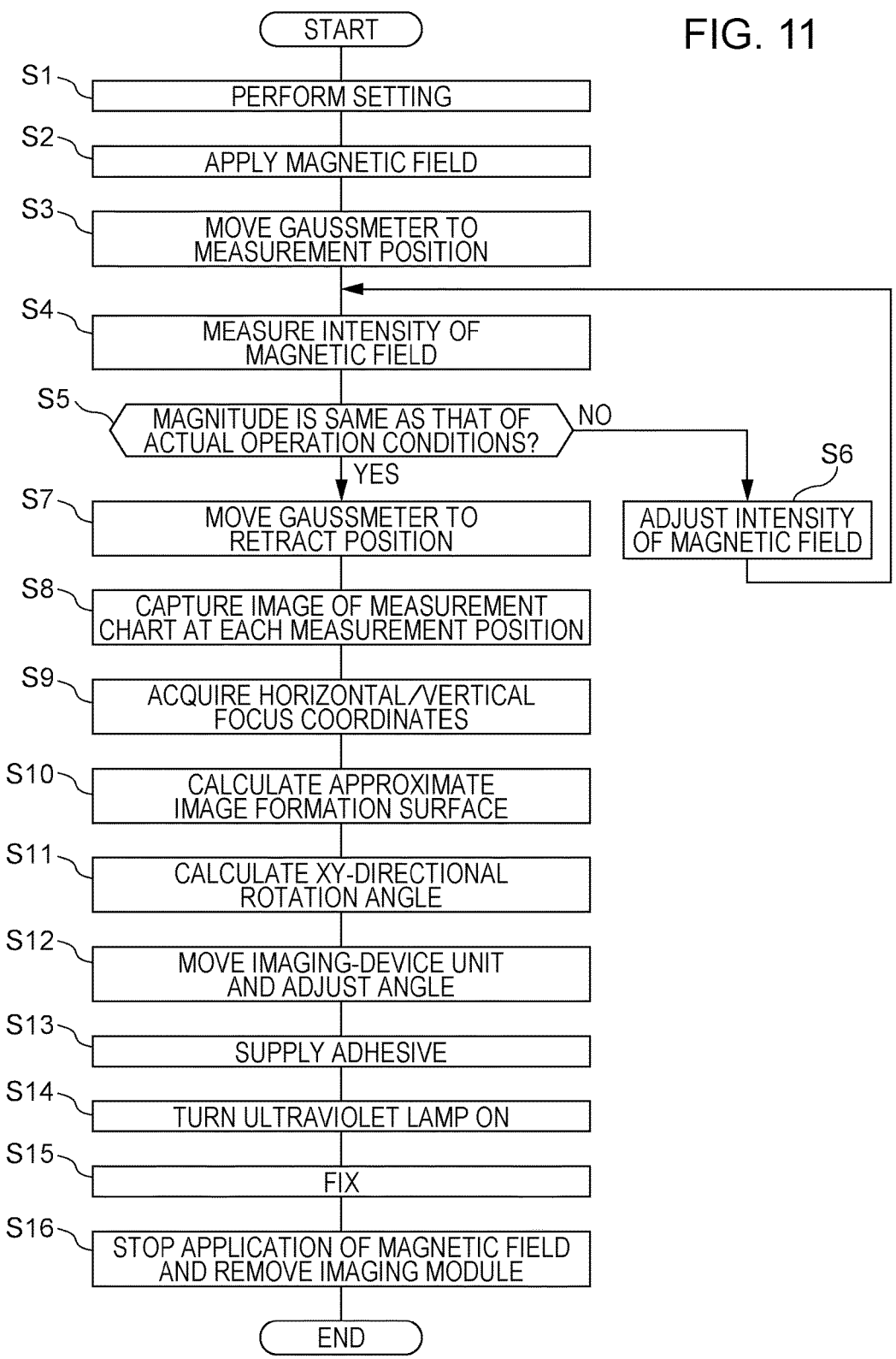
FIG. 11 is a flowchart illustrating a imaging-module manufacturing flow performed by the imaging-module manufacturing device according to the first embodiment, particularly, a flow of fixing the lens unit and the imaging device unit to each other.

Using the flowchart illustrated in FIG. 11, manufacturing of the imaging module 100 using the imaging-module manufacturing device 200 having the above-described configuration, particularly, a process of fixing the lens unit 10 and the imaging device unit 20 together is described now.

Firstly, an operation of setting the lens unit 10 and the imaging device unit 20 is described (step S1, first step).

The control unit 85 forms a space into which the lens unit 10 is insertable between the lens positioning plate 75 and the holding plate 114 by controlling the first slide stage 99 so that the holding plate 114 is moved in the Z direction. The lens unit 10 is held by a robot, not illustrated, and transported to the space between the lens positioning plate 75 and the holding plate 114.

The control unit 85 detects a movement of the lens unit 10 using an optical sensor or the like and moves the stage portion 99a of the first slide stage 99 toward the lens positioning plate 75. The recessed portions 95A, 95B, and 95C of the lens unit 10 come into contact with the contact pins 93A, 93B, and 93C and the insertion pins 93A1 and 93C1 are inserted into the recessed portions 95C1 and 95A1. Thus, the position of the lens unit 10 is fixed in the Z direction, the X direction, and the Y direction. When the stage portion 99a is moved further toward the lens positioning plate 75, the lens unit 10 is interposed between the holding plate 114 and the lens positioning plate 75, so that the lens unit 10 is set to the lens-unit holding portion 77.

In the state where the lens unit 10 is being held, the contactors of the probes 113a of the probe unit 113 are brought into contact with the terminals 14A to 14F of the lens unit 10, so that the X-direction VCM 50A, the Y-direction VCM 50C, and the Z-direction VCM 60E are electrically connected to the lens driver 145.

Subsequently, the control unit 85 forms a space into which the imaging device unit 20 is insertable between the lens-unit holding portion 77 and the biaxial rotation stage 119 by controlling the second slide stage 123 so that the biaxial rotation stage 119 is moved in the Z direction. The imaging device unit 20 is held by a robot, not illustrated, and transported to the space between the lens-unit holding portion 77 and the biaxial rotation stage 119.

The control unit 85 detects a movement of the imaging device unit 20 using an optical sensor or the like and moves the stage portion 123a of the second slide stage 123 toward the holding plate 114. Then, an operator sets the imaging device unit 20 at the imaging-device-unit holding portion 79 using the clamping members 115a of the chuck hand 115. The operator also connects the connector cable 127 to the external connection terminal unit 23 of the imaging device unit 20. Thus, the imaging device 27 and the control unit 85 become electrically connected together. Thereafter, the robot, not illustrated, is caused to let go of the imaging device unit 20. Thus, the operation of setting the lens unit 10 and the imaging device unit 20 is complete (step S1, first step).

After the completion of the setting operation, the control unit 85 controls the magnet driving circuit 218 so that power is supplied to the electromagnet 210 and a magnetic field is applied from the electromagnet 210 to the lens unit 10 (movable image-stabilizing unit 30) (step S2). The control unit 85 controls the gaussmeter shift mechanism 216 to move the gaussmeter 215 to each measurement position (step S3). Thus, the gaussmeter 215 measures the intensity of the magnetic field applied from the electromagnet 210 to the movable image-stabilizing unit 30 of the lens unit 10 held by components such as the lens-unit holding portion 77 (step S4).

Subsequently, the control unit 85 compares the measurement results of the intensity of the magnetic field input from the gaussmeter 215 with the intensity of the known actual-operation-condition magnetic field corresponding to the combination of the electronic device 301 of the specific model and the imaging module 100 of the specific model. Here, an operator has input, to the input unit 131, the intensity corresponding to the combination of the electronic device 301 of the specific model and the imaging module 100 of the specific model in advance and the control unit 85 uses, as a comparative example, the intensity of the actual-operation-condition magnetic field corresponding to the combination input to the input unit 131. Then, the control unit 85 determines whether the measurement result of the intensity of the magnetic field input from the gaussmeter 215 is the same as the magnitude of the actual-operation-condition magnetic field (step S5).

When the control unit 85 makes a determination of NO in step S5, the control unit 85 controls the magnet driving circuit 218 to increase or decrease the electric current supplied to the electromagnet 210 so that the intensity of the magnetic field applied from the electromagnet 210 to the movable image-stabilizing unit 30 of the lens unit 10 is adjusted (step S6). Then, the processes from the step S4 to step S6 are repeated until the control unit 85 makes a determination of YES in step S5. Thus, the movable image-stabilizing unit 30 in the imaging-module manufacturing device 200 can be tilted in the same manner as in the case of the actual operation conditions.

When the control unit 85 makes a determination of YES in step S5, the control unit 85 moves the gaussmeter 215 at a measurement position to the retract position (step S7). Thus, the gaussmeter 215 is prevented from disturbing adjustments of the position or the tilt of the imaging device unit 20 relative to the lens unit 10, described below.

Subsequently, in the state where the movable image-stabilizing unit 30 is tilted due to a magnetic field being applied from the electromagnet 210 as in the case of the actual operation conditions, the horizontal focus coordinate and the vertical focus coordinate at each of the imaging positions of the imaging surface 27*a* corresponding to the chart images CH1, CH2, CH3, CH4, and CH5 start being acquired.

The control unit 85 controls the second slide stage 123 so that the biaxial rotation stage 119 is moved in direction closer toward the holding plate 114 and moves the imaging device unit 20 to an initial measurement position at which the imaging device 27 is positioned closest to the lens unit 10.

After the movement of the imaging device unit 20, the control unit 85 causes the light source 91 of the measurement-chart installation portion 71 to emit light. The control unit 85 causes the lens driver 145 to input driving signals to the terminals 14A to 14F to drive the X-direction VCM 50A, the Y-direction VCM 50C, and the Z-direction VCM 60E, so that the position of the optical axis Ax of the lens group 12 in the X direction, the Y direction, and the Z direction is held at a reference position (for example, initial position during actual use).

Subsequently, the control unit 85 controls the imaging-device driver 147 so that the imaging device 27 is caused to capture chart images CH1, CH2, CH3, CH4, and CH5 imaged by the lens unit 10. The imaging device 27 inputs the captured image-capturing signals into the focus-coordinate acquiring circuit 149 through the connector cable 127.

The focus-coordinate acquiring circuit 149 extracts pixel signals at the imaging positions corresponding to the chart images CH1, CH2, CH3, CH4, and CH5 from the input image-capturing signals and calculates the X-CTF value and Y-CTF value for each imaging position from the pixel signals. The control unit 85 stores information of the X-CTF value and the Y-CTF value in, for example, a RAM in the control unit 85.

The control unit 85 sequentially moves the imaging device unit 20 to multiple measurement positions (Z0, Z1, Z2, . . . ) set in the Z direction. At each measurement position, the control unit 85 causes the imaging device 27 to capture a chart image of the measurement chart 89 while the position of the optical axis Ax of the lens group 12 in the X direction, the Y direction, and the Z direction is maintained at a reference position (step S8, second step). The focus-coordinate acquiring circuit 149 calculates the X-CTF values and the Y-CTF values at the imaging positions at each measurement position.

The focus-coordinate acquiring circuit 149 selects the maximum value at each imaging position from among the multiple X-CTF values and Y-CTF values thus calculated and acquires the Z-axis coordinate of the measurement position at which the maximum value is obtained as the horizontal focus coordinate and the vertical focus coordinate of the imaging position (step S9).

The horizontal focus coordinate and the vertical focus coordinate acquired by the focus-coordinate acquiring circuit 149 are input to the image-formation-surface calculation circuit 151. The image-formation-surface calculation circuit 151 calculates an approximate image formation surface obtained through two-dimensional approximation by, for example, the method of least squares (step S10). Thus, the reference position of the lens group 12 is calculated.

Information of the approximate image formation surface calculated by the image-formation-surface calculation circuit 151 is input to the adjustment calculation circuit 153.

The adjustment calculation circuit 153 calculates image-formation surface coordinates, which are a point of intersection of the approximate image formation surface and the Z-axis, and the XY-directional rotation angle, which is a tilt of the approximate image formation surface around the X-axis and the Y-axis with respect to the XY planes of coordinates (step S11). The adjustment calculation circuit 153 then outputs the image-formation surface coordinates and the XY-directional rotation angle to the control unit 85.

The control unit 85 controls the biaxial rotation stage 119 and the second slide stage 123 on the basis of the image-formation surface coordinates and the XY-directional rotation angle and moves the imaging device unit 20 in the Z direction so that the center position of the imaging surface 27*a* of the imaging device 27 coincides with the image-formation surface coordinates. The control unit 85 adjusts, on the basis of the XY-directional rotation angle, the tilt of the imaging device unit 20 relative to the lens unit 10 by adjusting the angles in the θX direction and the θY direction of the imaging device unit 20 (step S12). Thus, the tilt of the lens group 12 relative to the imaging device 27 is adjusted to be in the reference position in the state where the magnetic field is applied from the electromagnet 210 to the movable image-stabilizing unit 30 of the lens unit 10, that is, in the same state as in the actual operation conditions. As described above, in the case where the lens group 12 is in a perfect state, the optical axis Ax of the lens group 12 is parallel to dotted line V (see FIG. 3) perpendicular to the imaging surface 27*a*.

The control unit 85 supplies the adhesive 18 to a gap between the lens unit 10 and the imaging device unit 20 from the adhesive supplying portion 81 (step S13). The control unit 85 then turns the ultraviolet lamp 83 on after the movement and tilt adjustment of the imaging device unit 20 (step S14). Thus, the adhesive 18 cures and the lens unit 10 and the imaging device unit 20 are fixed together (step S15). Here, step S9 to step S15 correspond to a third step of the present invention.

After the lens unit 10 and the imaging device unit 20 are fixed together, the control unit 85 controls the magnet driving circuit 218 to stop supply of electric current to the electromagnet 210 so that the application of the magnetic field from the electromagnet 210 is stopped (step S16). After the application of the magnetic field is stopped, the movable image-stabilizing unit 30 returns to the position before the application of the magnetic field due to the elastic resilience of the elastic support unit 40. Thus, the lens group 12 also becomes in the state of being tilted from the reference position.

Subsequently, the control unit 85 moves the stage portion 99*a* toward the imaging-device-unit holding portion 79 to detach the contactors of the probes 113*a* and the terminals 14A to 14F of the lens unit 10 from one another. Thereafter, the complete imaging module 100 is removed from the imaging-module manufacturing device 200 by a robot, not illustrated (step S16).

Although the lens unit 10 and the imaging device unit 20 can be fixed using the ultraviolet curable adhesive 18, curing using the adhesive 18 may be used as temporary fixing of the lens unit 10 and the imaging device unit 20 together. For example, in the state where the lens unit 10 and the imaging device unit 20 are temporarily fixed together, the imaging module 100 may be removed from the imaging-module manufacturing device 200. After an intended process such as a cleaning process is performed, the lens unit 10 and the imaging device unit 20 may be permanently fixed by a thermosetting adhesive or the like.

<Effects of the Present Invention>

Figure 12A:
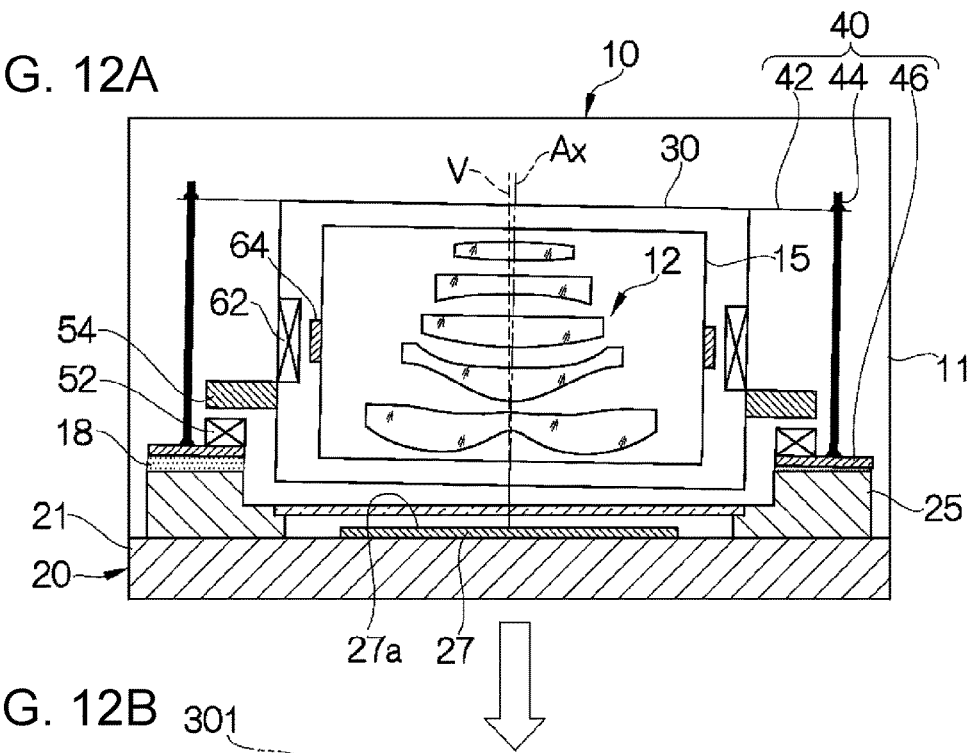
FIGS. 12A and 12B are illustrations illustrating an imaging module in the state of being installed in an electronic device.

As illustrated in FIG. 12A, in the imaging module 100 manufactured in the present invention, the tilt of the imaging device unit 20 relative to the lens unit 10 is adjusted on the basis of the XY-directional rotation angle calculated in the state where the magnetic field is applied from the electromagnet 210 to the movable image-stabilizing unit 30 of the lens unit 10 to fix the lens unit 10 and the imaging device unit 20 together. Thus, the lens group 12 is tilted from the reference position in the state before the imaging module 100 is installed in the electronic device 301.

Figure 12B:
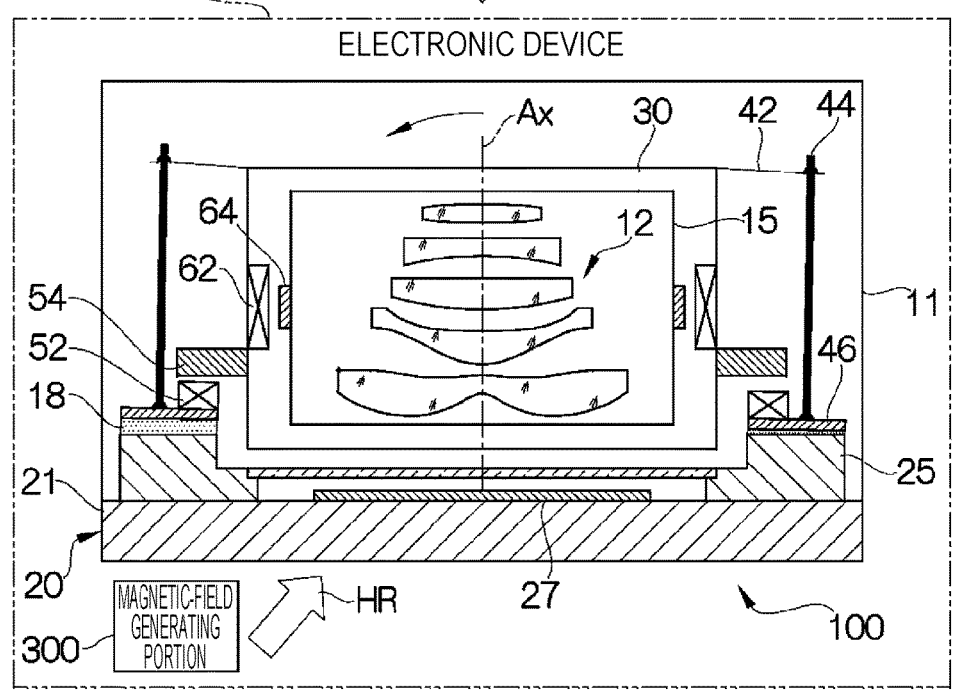

As illustrated in FIG. 12B, when the imaging module 100 is installed in the electronic device 301, the magnetic field applied from the magnetic-field generating unit 300 to the lens unit 10 tilts the movable image-stabilizing unit 30 by an amount of tilt the same as the amount of tilt by which the movable image-stabilizing unit 30 is tilted due to the above-described magnetic field being applied from the electromagnet 210 in the same direction as the direction in which the movable image-stabilizing unit 30 is tilted due to the above-described magnetic field being applied from the electromagnet 210 ("the same" here includes the meaning of "substantially the same"). Consequently, the lens group 12 is adjusted to be in the reference position. In the case where the lens group 12 is in a perfect state as in the case of the embodiment, the optical axis Ax of the lens group 12 is adjusted to be in the position perpendicular to the imaging surface 27a. Thus, the lens group 12 can be prevented from being tilted from the reference position even when the imaging module 100 is disposed near the magnetic-field generating unit 300 in the electronic device 301. This configuration can thus increase the flexibility of the component arrangement (such as the imaging module 100 and the magnetic-field generating unit 300) in the electronic device 301.

As in a comparative example illustrated in FIG. 13A, in an imaging module manufactured by adjusting the tilt of the imaging device unit 20 relative to the lens unit 10 in the state where a magnetic field is not applied to the movable image-stabilizing unit 30, the lens group 12 is adjusted to be in the reference position in the state where the magnetic field is not applied. Thus, when the imaging module is installed in the electronic device 301, the lens group 12 is tilted from the reference position as a result of the movable image-stabilizing unit 30 being tilted by the magnetic field applied from the magnetic-field generating unit 300 to the lens unit 10. Consequently, the resolution over the screen varies due to the tilt of the lens group 12, as illustrated in the drawings of distributions of the resolution of an image captured by this imaging module. In FIGS. 13A and 13B, the resolution over the screen is expressed with light and shade where a lighter area has a higher resolution.

In contrast to such a comparative example, in this invention, the imaging module 100 is manufactured by adjusting the tilt of the imaging device unit 20 relative to the lens unit 10 in the state where the magnetic field having a magnitude equal to the magnitude of the actual-operation-condition magnetic field is applied to the movable image-stabilizing unit 30 of the lens unit 10. Thus, as illustrated in FIG. 13B, when the imaging module 100 is installed in the electronic device 301, the movable image-stabilizing unit 30 is tilted by the magnetic field applied from the magnetic-field generating unit 300 to the lens unit 10, so that the lens group 12 is adjusted to be in the reference position. Consequently, the distribution of the resolution over the screen displaying an image captured by the imaging module 100 according to the present invention is rendered uniform, so that a favorable image can be obtained.

The lens group 12 of the present invention illustrated in FIG. 13B is an example of a case where the lens group 12 of the comparative example illustrated in FIG. 13A is tilted by 0.26 degrees. In this manner in the present invention, a favorable image in which the distribution of the resolution over the screen is rendered uniform can be obtained by adjusting the tilt of the lens group 12 at 0.2 to 0.3 degrees, which is smaller than 0.6 degrees defined as an allowable value of tilt in the above-described invention described in JP2012-256017A, although the degrees vary depending on the distance between the magnetic-field generating unit 300 and the lens unit 10 and the intensity of the magnetic field produced by the magnetic-field generating unit 300.

<Other Examples of First Embodiment>

In step S8 in FIG. 11, the focus coordinates may be acquired at each measurement position by changing the measurement position as a result of rendering the lens positioning plate 75 and the lens-unit holding portion 77 movable in the Z direction and moving the lens-unit holding portion 77 or other components in the Z direction while the imaging-device-unit holding portion 79 is left at a fixed position in the Z direction or as a result of moving the lens-unit holding portion 77 or other components and the imaging-device-unit holding portion 79 in the Z direction.

Alternatively, the focus coordinates may be acquired by changing the measurement position as a result of moving the measurement-chart installation portion 71 in the Z direction while the lens-unit holding portion 77 or other components and the imaging-device-unit holding portion 79 are left at fixed positions in the Z direction. Alternatively, the focus coordinates may be acquired by changing the measurement position as a result of changing the positions of the lens-unit holding portion 77 or other components, the imaging-device-unit holding portion 79, and the measurement-chart installation portion 71 in the Z direction. In other words, any configuration will suffice as long as the focus coordinates are acquired as a result of the imaging device 27 capturing images of the measurement chart 89 at each relative position of the lens unit 10, the imaging device unit 20, and the measurement chart 89 in the Z direction after the relative position is changed to change the measurement position.

The first embodiment describes the case where multiple measurement positions are set by changing the relative position and images of the measurement chart are captured when the measurement positions are set. Instead, images of the measurement chart may be continuously captured (that is, moving images are captured) and the relative position may be changed so as to set the measurement positions during capturing of the moving images.

In step S12 of FIG. 11, described above, the position of the imaging device unit 20 in the Z direction relative to the lens unit 10 is adjusted by moving the imaging device unit 20 while the position of the lens unit 10 in the Z direction is left at a fixed position. As a modified example, the positions may be adjusted by rendering the lens-unit holding portion 77 or other components movable in the Z direction and moving the lens-unit holding portion 77 or other components while the imaging-device-unit holding portion 79 is left at a fixed position or by moving the lens-unit holding portion 77 or other components and the imaging-device-unit holding portion 79. Alternatively, the tilt of the lens unit 10 may be adjusted using the lens-unit holding portion 77 or other components while the imaging-device-unit holding portion 79 is left at a fixed position.

In step S12 of FIG. 11, the position of the imaging device unit 20 in the Z direction and the tilt of the imaging device unit 20 relative to the lens unit 10 are adjusted. However, the adjustment of the position in the Z direction may be omitted. In a configuration, for example, where the lens barrel 15 in the lens unit 10 is rendered slidable in the direction of the optical axis Ax using a screw structure or the like, the adjustment of the position in the Z direction may be omitted.

In the imaging-module manufacturing device 200, the imaging device 27 and the imaging-device driver 147 are electrically connected together using the external connection terminal unit 23 of the imaging device unit 20. However, the electric connection method may be changed as appropriate to, for example, a method with which multiple probes that come into contact with the back surface of the imaging device 27 are disposed on the biaxial rotation stage 119 so that the imaging device 27 and the imaging-device driver 147 are electrically connected together.

In the imaging-module manufacturing device 200, the recessed portions 95A, 95B, and 95C of the lens unit 10 are brought into contact with the contact pins 93A, 93B, and 93C of the lens positioning plate 75 and the lens unit 10 is pressed against the lens positioning plate 75 by the holding plate 114, so that the lens unit 10 is held on the Z-axis. However, the lens unit 10 may be held on the Z-axis using, for example, various types of jigs.

In the above-described embodiment, in order to adjust the tilt of the imaging device unit 20 using the biaxial rotation stage 119, the XY-directional rotation angle is calculated by the adjustment calculation circuit 153. However, the compensation value is not particularly limited to the XY-directional rotation angle as long as the compensation value represents the direction of tilt and the amount of tilt for tilt adjustment. Alternatively, tilt adjustment may be performed by using a device other than the biaxial rotation stage.

[Method and Device for Manufacturing Imaging Module According to Second Embodiment]

Figure 15A:
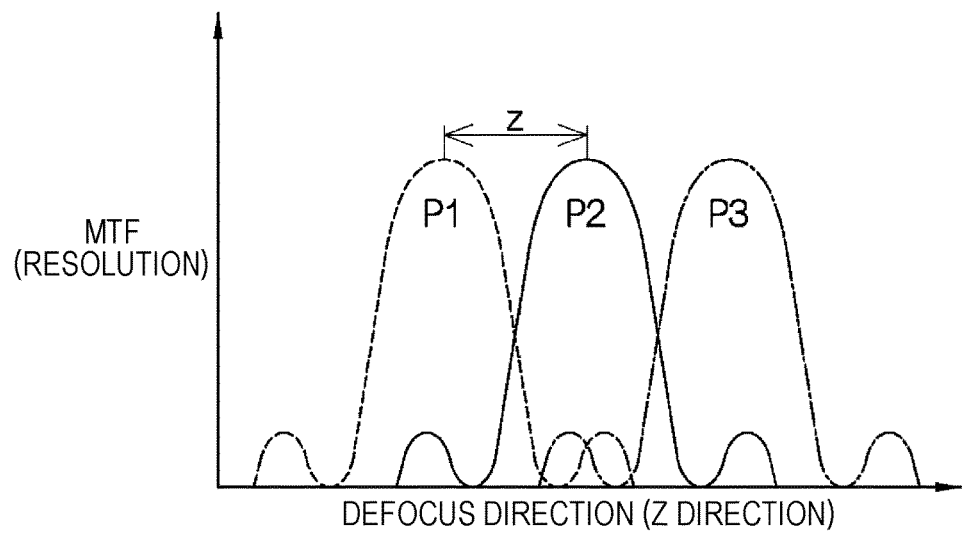
FIGS. 15A and 15B are graphs illustrating MTF-value measurement data measured by the imaging-module manufacturing device according to the second embodiment.
Figure 15B:
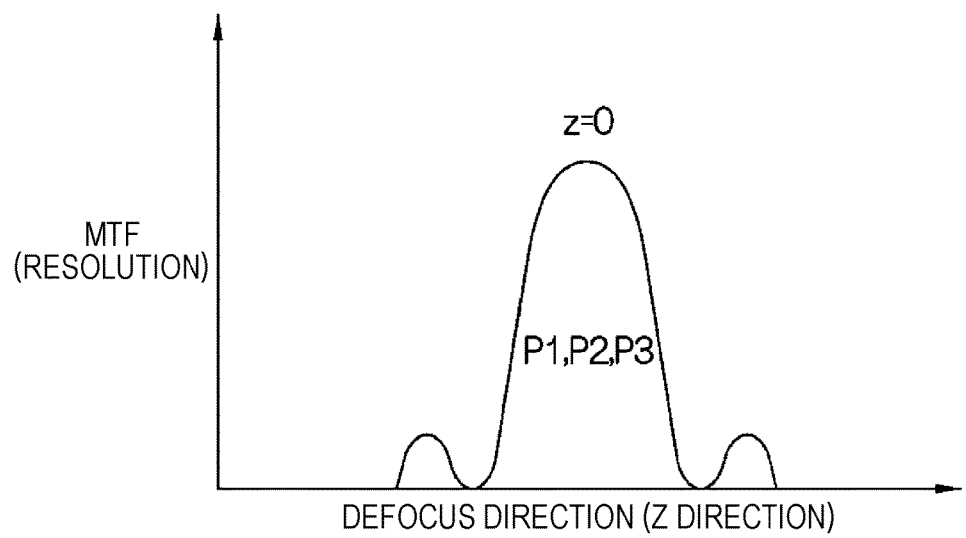

Referring to FIG. 14 and FIGS. 15A and 15B, a method and a device for manufacturing an imaging module according to a second embodiment of the present invention are described now. In the first embodiment, CTF values at multiple imaging positions are calculated for multiple measurement positions (Z0, Z1, Z2, . . . ) set on the Z-axis. On the basis of the calculation results, the XY-directional rotation angle or the like is acquired. In the second embodiment, on the other hand, modulation transfer function values (Modulation Transfer Function: hereinafter abbreviated to MTF) indicating the resolutions of the lens group 12 as focus evaluation values are calculated and, on the basis of the calculation results, the XY-directional rotation angle is calculated.

An imaging-module manufacturing device 200A used in the imaging-module manufacturing method according to the second embodiment has basically the same configuration as the imaging-module manufacturing device 200 according to the first embodiment except that it calculates MTF values instead of CTF values as focus evaluation values. Thus, components having the same functions and configurations as those according to the first embodiment are denoted by the same reference symbols and are not described. Here, for calculation of MTF values, a measurement chart 89A (see FIG. 17) having, for example, a stripe pattern (also referred to as a ladder pattern or a rectangular wave pattern) in which white and black lines are alternately and repeatedly arranged in parallel is used in the imaging-module manufacturing device 200A.

As illustrated in FIG. 14, in the imaging-module manufacturing device 200A, the control unit 85 controls the second slide stage 123 to sequentially move the imaging device unit 20 in the Z direction (defocus direction) to the multiple measurement positions (Z0, Z1, Z2, . . . ) after the setting operation in step S1 (first step) illustrated in FIG. 11 according to the first embodiment is performed. The control unit 85 controls the imaging-device driver 147 to cause the imaging device 27 to capture chart images of the measurement chart 89A imaged by the lens group 12 at the measurement positions (Z0Z1, Z2, . . . ) (second step). At this time, the processes from step S2 to step S7 (see FIG. 11) described in the first embodiment are performed so that the magnetic field is applied from the electromagnet 210 to the movable image-stabilizing unit 30 of the lens unit 10.

A MTF-value calculation circuit 156 extracts pixel signals corresponding to the multiple imaging positions (P1, P2, and P3) from among the image-capturing signals input through the connector cable 127 or the like and calculates the individual MTF values corresponding to the multiple imaging positions from the pixel signals. The number of imaging positions is not limited to a particular number. A MTF value is a value representing the solution of the lens group 12. When the MTF value is high, the degree of focus is regarded as being high.

The MTF-value calculation circuit 156 calculates MTF values at multiple imaging positions in multiple directions set on the XY planes of coordinates at each of multiple measurement positions (Z0, Z1, Z2, . . . ) set on the Z-axis. The directions for which a MTF value is calculated are, for example, a horizontal direction (X direction), which is a lateral direction of the imaging surface 27a, and a vertical direction (Y direction), perpendicular to the horizontal direction. An X-MTF value and a Y-MTF value, which are MTF values of the respective directions, are calculated. Thus, MTF-value measurement data, obtained by measuring the X-MTF values and the Y-MTF values at multiple imaging positions (P1, P2, and P3) at each of the multiple measurement positions (Z0, Z1, Z2, . . . ), are obtained. The MTF-value calculation circuit 156 outputs the MTF-value measurement data to an adjustment calculation circuit 153A.

FIG. 15A illustrates an example of the MTF-value measurement data of the Y-MTF values. FIG. 15B illustrates an example of the MTF-value measurement data of the Y-MTF values in the case where the lens group 12 is adjusted to be in the reference position, in which the peaks of the waveforms of the MTF values corresponding to the multiple imaging positions (P1, P2, and P3) substantially coincide with one another. Thus, when the positions of the peaks of the waveforms of the MTF values corresponding to the multiple imaging positions (P1, P2, and P3) are calculated from the MTF-value measurement data, the X-direction rotation angle, which is a rotation angle around the X-axis for adjusting the lens group 12 to be in the reference position, can be calculated on the basis of the differences between the positions of individual peaks.

For example, the X-direction rotation angle is obtained as $\theta$ in formula [$\tan \theta = z/y$], where a difference between peak positions of the imaging position P1 and the imaging position P2 is denoted by "z" and a difference in position in the Y direction between the imaging position P1 and the imaging position P2 is denoted by "y" (see FIG. 14). In the same manner, the Y-direction rotation angle can be calculated from the MTF-value measurement data corresponding to the X-MTF value.

Figure 16A:
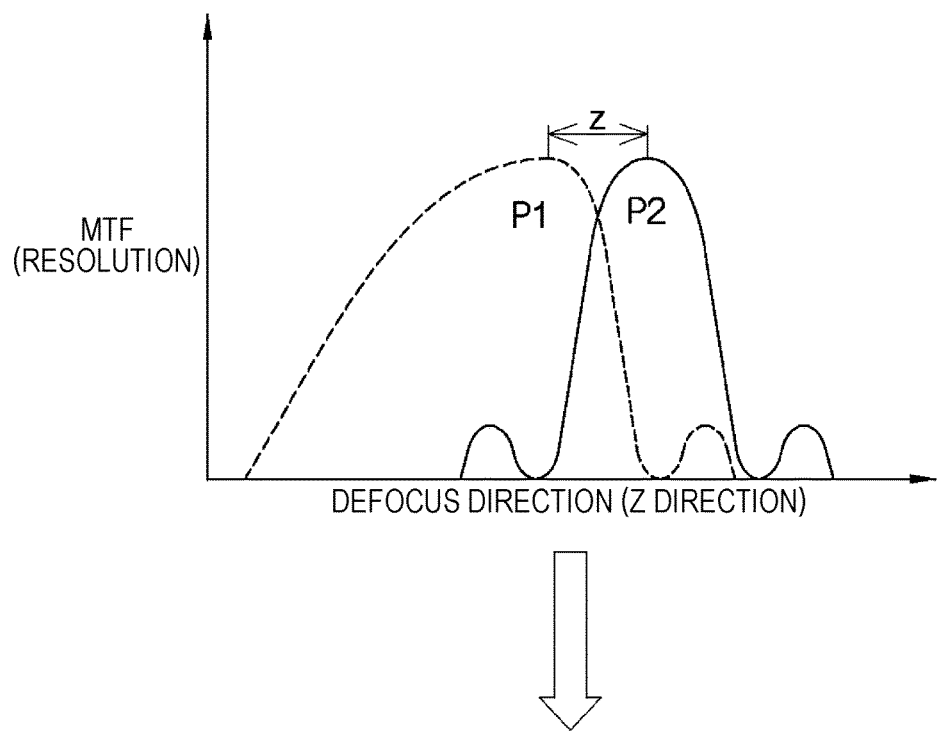
FIGS. 16A and 16B are graphs illustrating a calculation of a XY-directional rotation angle in the case where a waveform of a MTF value of the MTF-value measurement data measured by the imaging-module manufacturing device according to the second embodiment has a shape of a substantially bilateral asymmetry with respect to the peak position.
Figure 16B:
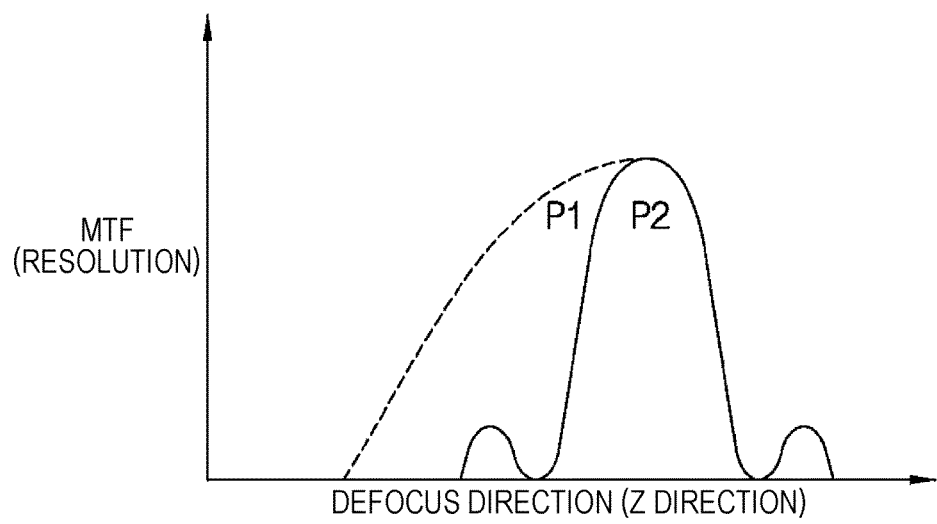

Each of the waveforms of the MTF values corresponding to the multiple imaging positions (P1, P2, and P3) illustrated in FIGS. 15A and 15B has a substantially laterally symmetrical shape with respect to the peak position of the waveform. However, as illustrated in FIG. 16A for example, the waveform of a MTF value has, in some cases, a laterally asymmetrical shape with respect to the peak position of the waveform. Even in such a case, as illustrated in FIG. 16B, the XY-directional rotation angle at which the peak positions of the waveforms of the MTF values corresponding to multiple imaging positions (FIGS. 16A and 16B illustrate only P1 and P2) overlap with each other is calculated.

Referring back to FIG. 14, the adjustment calculation circuit 153A calculates the XY-directional rotation angle by calculating the difference between the peak positions of the waveforms of the MTF values corresponding to the multiple imaging positions (P1, P2, and P3) on the basis of the MTF-value measurement data input from the MTF-value calculation circuit 156, as described above referring to the FIGS. 15A and 15B, and outputs the XY-directional rotation angle to the control unit 85.

On the basis of the XY-directional rotation angle input from the adjustment calculation circuit 153A, the control unit 85 controls the biaxial rotation stage 119 to adjust the tilt of the imaging device unit 20. Thereafter, the processes from step S13 to step S15 described in the first embodiment (see FIG. 11) are performed to fix the lens unit 10 and the imaging device unit 20 together (third step).

In this manner, also in the second embodiment, the imaging module 100 is manufactured by adjusting the tilt of the imaging device unit 20 relative to the lens unit 10 in the state where the magnetic field having a magnitude equal to the magnitude of the actual-operation-condition magnetic field is applied to the movable image-stabilizing unit 30 of the lens unit 10. Thus, when the imaging module 100 is installed in the electronic device 301, the movable image-stabilizing unit 30 is tilted due to the magnetic field being applied from the magnetic-field generating unit 300 to the lens unit 10, so that the lens group 12 is adjusted to be in the reference position. As a result, effects the same as those described in the first embodiment are obtained.

<Another Example of Second Embodiment: Measurement of Low-Frequency MTF>

In the second embodiment, MTF values are measured as the resolution in the present invention. The MTF values are preferably low-frequency MTFs.

Figure 17A:
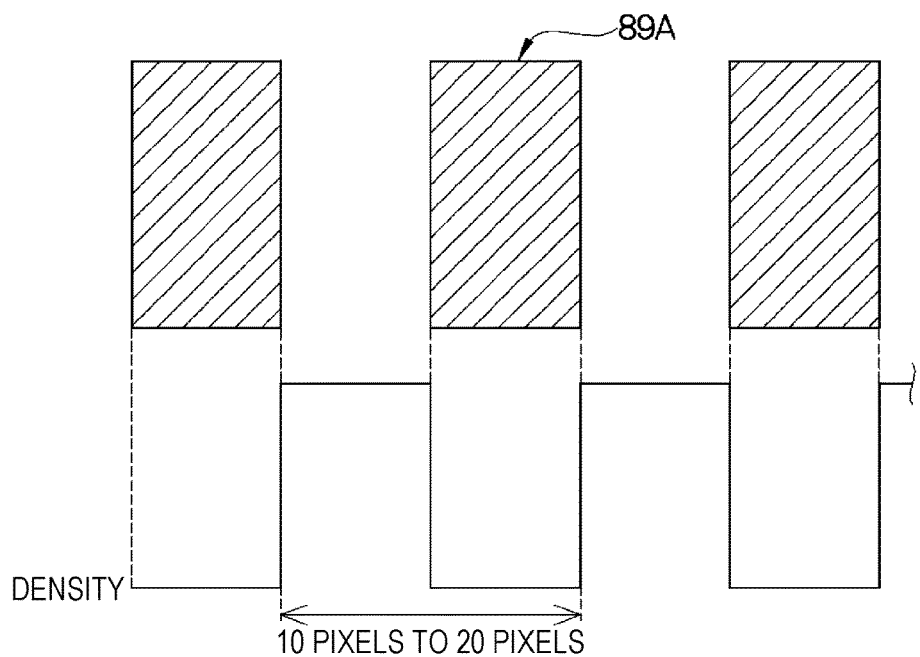
FIG. 17A is an illustration illustrating a low-frequency MTF and FIG. 17B is an illustration illustrating a high-frequency MTF.
Figure 17B:
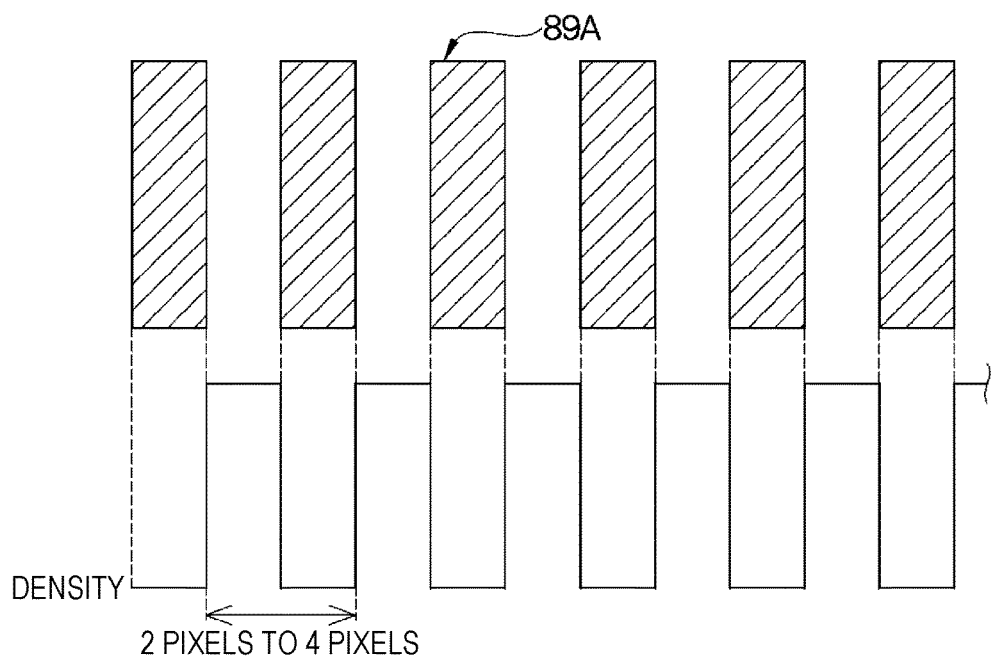

As illustrated in FIG. 17A, the "low-frequency MTFs" here are MTF values obtained by capturing images of the stripe-patterned measurement chart 89A having a pattern pitch corresponding to 10 pixels to 20 pixels of the imaging device 27. Here, as illustrated in FIG. 17B, the "high-frequency MTFs" are MTF values obtained by capturing images of the stripe-patterned measurement chart 89A having a pattern pitch corresponding to 2 pixels to 4 pixels of the imaging device 27. The low-frequency MTFs represent the performance such as the contrast or tightness in black. On the other hand, the high-frequency MTFs represent the performance of the resolving power (for example, the performance of whether small characters written on a signboard or the like are legible). Although the case where the lens group 12 in a perfect state is described in each embodiment, the lens group 12 that is in an imperfect state has manufacturing errors such as formation or assembly errors, distortion, or other defects. In the case where manufacturing errors or other defects of the lens group 12 are to be measured, the high-frequency MTFs of the lens group 12 are typically measured.

Here, any MTF values will suffice as long as the imaging-module manufacturing device 200A can calculate the "XY-directional rotation angle" on the basis of the MTF values. If the high-frequency MTFs are used, manufacturing errors or other defects of the lens group 12 are reflected on the calculation results of the "XY-directional rotation angle". An accurate calculation of the "XY-directional rotation angle" is thus failed. Thus, in consideration of, particularly, an actual lens group 12 in which manufacturing errors or other defects occur, it is preferable that low-frequency MTFs are measured as MTF values. The effect of the magnetic field can thus be accurately measured, so that more accurate "XY-directional rotation angle" can be calculated while the effect of the manufacturing errors of the lens group 12 is suppressed.

<Another Example of Second Embodiment: Others>

Although the second embodiment abbreviates the calculation of the image-formation surface coordinates or the adjustment of the position of the imaging device unit 20 in the Z direction, which have been described in the first embodiment, the calculation and the adjustment may be performed in the same manner as in the case of the first embodiment. The contents described in another example of the first embodiment are also applicable to the second embodiment. In each of the embodiments, CTF values or MTF values are measured as values indicating the resolutions of the lens group 12. However, spatial frequency response (SFR) values or other values may be measured, instead. Alternatively, the resolution of the lens group 12 may be measured from images of, for example, a landscape.

[Example of Imaging Module Used in Smartphone]

Examples of the electronic device 301 in which the imaging module 100 having the above-described configuration is installed include smartphones, mobile phones, tablet machines, personal digital assistants (PDAs), glass-shaped information terminals, hand-held game machines, portable music players, and camera-equipped watches. A smartphone is taken as an example and described below in detail referring to the drawings.

Figure 18:
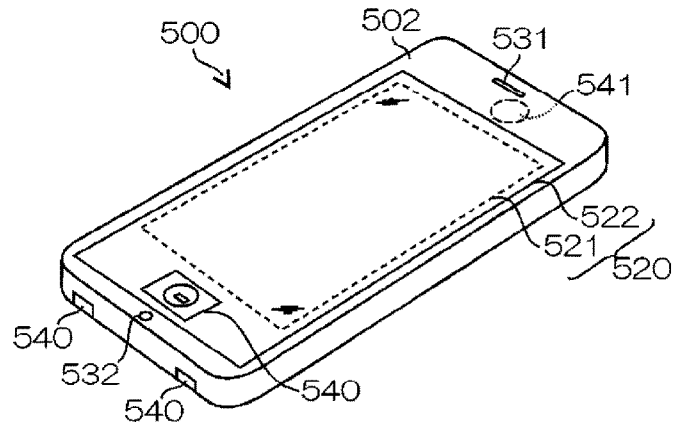
FIG. 18 illustrates the exterior of a smartphone, which is an embodiment of the electronic device.

FIG. 18 illustrates the external appearance of a smartphone 500 in which the imaging module 100 is installed. The smartphone 500 illustrated in FIG. 18 includes a housing 502 having a flat plate shape and includes, on one surface of the housing 502, a display input unit 520 in which a display panel 521, serving as a display portion, and a control panel 522, serving as an input unit, are integrated together. The housing 502 includes a speaker 531, a microphone 532, an operating unit 540, and a camera unit 541 including the above-described imaging module 100.

The camera unit 541 is disposed near the speaker 531, which is a magnetic-field generating unit, and on the back surface that opposes the operation-side surface on which the speaker 531 is disposed. The configuration of the housing 502 is not limited to this. For example, another configuration in which the display portion and the input unit are separately provided may be employed or a configuration having a collapsible structure or a sliding mechanism may be employed.

Figure 19:
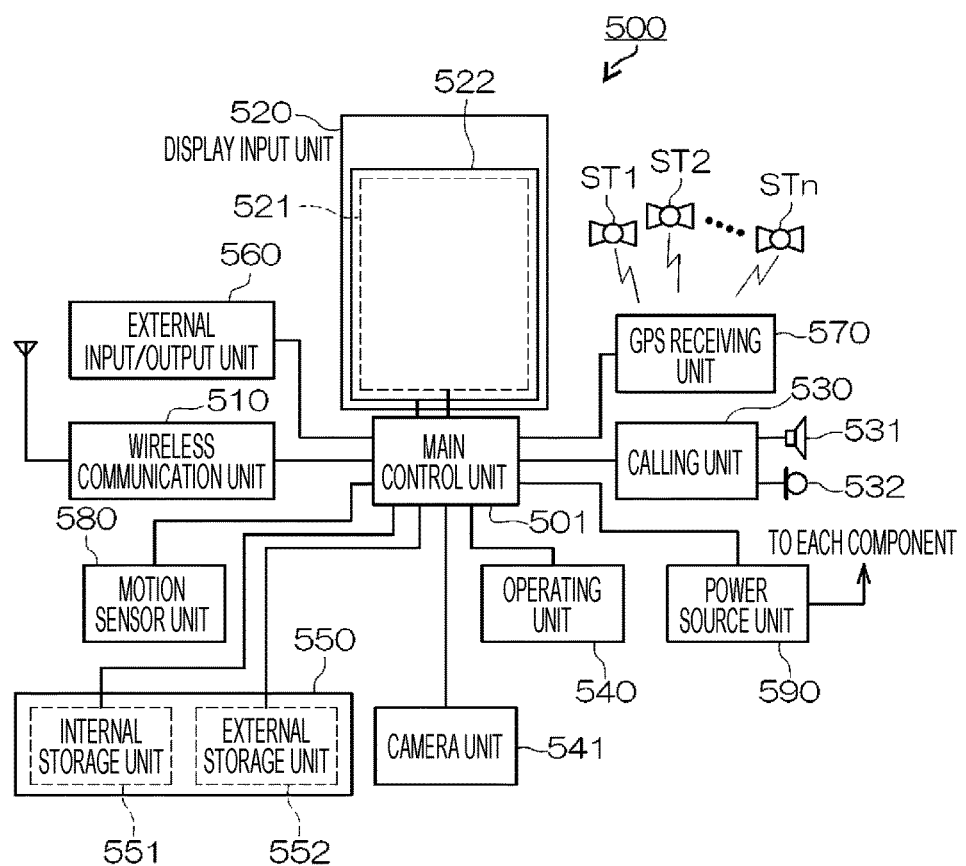
FIG. 19 is a block diagram of the electrical configuration of the smartphone.
Figure 20:
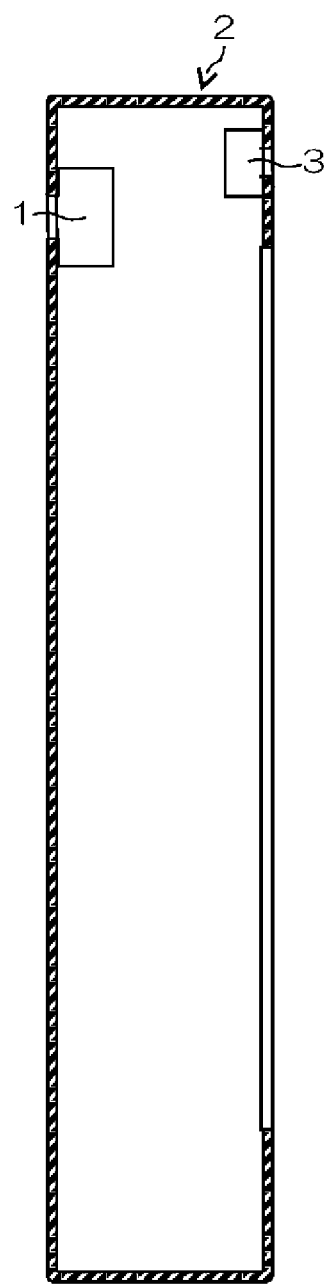
FIG. 20 is a cross-sectional view of a main portion of a smartphone when an imaging module is installed in the smartphone.

FIG. 19 is a block diagram illustrating the configuration of the smartphone 500 illustrated in FIG. 18. As illustrated in FIG. 19, the smartphone 500 includes, as main components, a wireless communication unit 510, a display input unit 520, a calling unit 530, operating units 540, a camera unit 541, a storage unit 550, an external input/output unit 560, a global positioning system (GPS) receiving unit 570, a motion sensor unit 580, a power source unit 590, and a main control unit 501. The smartphone 500 has, as a main function, a wireless communication function with which it performs mobile wireless communication via base station devices and a mobile communication network.

In accordance with commands from the main control unit 501, the wireless communication unit 510 performs wireless communication with base station devices accommodated in the mobile communication network. Using this wireless communication, the wireless communication unit 510 transmits or receives data such as various types of file data including audio data and image data or e-mail data or receives data such as web data or streaming data.

The display input unit 520 is a so-called touch screen that, under the control of the main control unit 501, displays image (still image and moving image) or text data to visually transmit information to users and detects user operations performed in response to the displayed information. The display input unit 520 includes a display panel 521 and a control panel 522. It is preferable that the display panel 521 be a three-dimensional display panel for displaying three-dimensional images generated.

In the display panel 521, a liquid crystal display (LCD), an organic electro-luminescence display (OELD), or the like is used as a display device.

The control panel 522 is a device that is placed so as to allow images displayed on the display surface of the display panel 521 visible and that detects coordinates operated by a user's finger or a stylus. When the device is operated by a user's finger or a stylus, a detection signal that results from the operation is output to the main control unit 501. Subsequently, the main control unit 501 detects operated positions (coordinates) on the display panel 521 on the basis of the received detection signal.

As illustrated in FIG. 18, the display panel 521 and the control panel 522 of the smartphone 500 are integrated together to constitute the display input unit 520. The control panel 522 is disposed so as to fully cover the display panel 521. In the case where this disposition is employed, the control panel 522 may also have a function with which it detects user operations performed in an area outside the display panel 521. In other words, the control panel 522 may include a detection area corresponding to an overlapping portion that overlaps with the display panel 521 (hereinafter referred to as a display area) and a detection area corresponding to a remaining outer-edge portion that does not overlap the display panel 521 (hereinafter referred to as a nondisplay area).

The size of the display area and the size of the display panel 521 may completely coincide with each other but do not necessarily have to coincide with each other. The control panel 522 may include two sensitive areas, that is, an outer-edge portion and the remaining inner portion. The width of the outer-edge portion is appropriately designed in accordance with, for example, the size of the housing 502. Examples of position detection methods employed in the control panel 522 include a matrix switch method, a resistive film method, a surface acoustic wave method, an infrared ray method, an electromagnetic induction method, and a capacitive method. Any of these methods may be employed.

The calling unit 530 includes a speaker 531 and a microphone 532. The calling unit 530 is a portion that converts a user's voice input through the microphone 532 into audio data processable by the main control unit 501 and outputs the audio data to the main control unit 501 or that decodes the audio data received by the wireless communication unit 510 or the external input/output unit 560 and outputs the decoded audio data from the speaker 531. As illustrated in FIG. 18, the speaker 531 and the microphone 532 may be disposed on, for example, the same surface on which the display input unit 520 is disposed.

The operating units 540 are hardware keys including key switches and are portions that receive commands from the user. For example, the operating units 540 are disposed at a portion below and on a side below the display portion of the housing 502 of the smartphone 500 and are push-button switches that are turned on when pushed by a finger or the like and turned off when the finger is taken off due to the resilience of, for example, a spring.

The storage unit 550 is a portion that stores control programs or control data of the main control unit 501, address data in which the names, the telephone numbers, and other information of communication counterparts are associated with one another, transmitted and received e-mail data, web data downloaded through web browsing, or downloaded content data, and temporality stores streaming data or other data. The storage unit 550 includes an internal storage unit 551 installed in the smartphone and an external storage unit 552 including a removable external memory slot. Each of the internal storage unit 551 and the external storage unit 552 that constitute the storage unit 550 is embodied by using a storage medium such as a flash memory type memory, a hard disk type memory, a MultiMediaCardmicro type memory, a card type memory (for example, microSD (registered trademark)), a random access memory (RAM), or a read only memory (ROM).

The external input/output unit 560 is a portion that acts as an interface between the smartphone 500 and all the external devices connected to the smartphone 500. The external input/output unit 560 is used to directly or indirectly connect to other external devices through communications (for example, Universal Serial Bus (USB), IEEE1394, or the like) or a network (for example, Internet, wireless LAN, Bluetooth (registered trademark), radio frequency identification (RFID), infrared transmission (Infrared Data Association: IrDA) (registered trademark), Ultra wideband (UWB) (registered trademark), or ZigBee (registered trademark)).

Examples of the external devices connected to the smartphone 500 include a wired/wireless headset, a wired/wireless external charger, a wired/wireless data port, a memory card, a subscriber identity module (SIM) card, and a user identity module (UIM) card, which are connected to the smartphone 500 through a card socket, an external audio/video device connected to the smartphone 500 through an audio/video input/output (I/O) terminal, an external audio/video device wirelessly connected to the smartphone 500, a smartphone connected to the smartphone 500 with wires or wirelessly, a personal computer connected to the smartphone 500 with wires or wirelessly, a personal digital assistant (PDA) connected to the smartphone 500 with wires or wirelessly, and an earphone. The external input/output portion can transmit data transmitted from these external devices to each component in the smartphone 500 or cause data inside the smartphone 500 to be transmitted to the external devices.

In accordance with commands from the main control unit 501, the GPS receiving unit 570 receives GPS signals transmitted from GPS satellites ST1 to STn, performs a position-measurement process on the basis of the multiple GPS signals received, and detects the position of the smartphone 500 defined by latitude, longitude, and altitude. When the GPS receiving unit 570 can obtain position information from the wireless communication unit 510 or the external input/output unit 560 (for example, wireless LAN), the GPS receiving unit 570 can detect the position using the position information.

The motion sensor unit 580 includes, for example, a three-axis accelerometer and detects a physical movement of the smartphone 500 in accordance with a command from the main control unit 501. By detecting a physical movement of the smartphone 500, the direction in which the smartphone 500 moves or the acceleration of the smartphone 500 is detected. The result of this detection is output to the main control unit 501.

In accordance with a command from the main control unit 501, the power source unit 590 supplies power storable in a battery (not illustrated) to each unit of the smartphone 500.

The main control unit 501 includes a microprocessor. The main control unit 501 operates in accordance with a control program or control data stored in the storage unit 550 and controls all the components of the smartphone 500. The main control unit 501 has a mobile communication control function, with which it controls each of the communication-related units, and an application processing function in order to perform voice communication or data communication through the wireless communication unit 510.

The application processing function is performed as a result of the main control unit 501 operating in accordance with an application software stored in the storage unit 550. Examples of the application processing function include an infrared communication function for performing data communication with an opposing device under the control of the external input/output unit 560, an e-mail function for transmitting and receiving e-mails, and a web browsing function for browsing web pages.

The main control unit 501 has an image processing function for, for example, displaying an image on the display input unit 520 on the basis of image data (still-image or moving-image data) such as the received data or downloaded streaming data. The image processing function is a function with which the main control unit 501 decodes the image data, performs image processing on the decoded data, and displays an image on the display input unit 520.

The main control unit 501 also performs display control on the display panel 521 and an operation detection control to detect a user operation performed through the operating unit 540 and the control panel 522.

By executing the display control, the main control unit 501 displays software keys such as icons for activing application software or scrollbars or displays a window for composing e-mails. Here, the scrollbars represent software keys used for receiving a command of moving a displayed portion of an image that is, for example, too large to be displayed over the display area of the display panel 521.

By executing the operation detection control, the main control unit 501 detects a user operation performed through the operating unit 540, receives, through the control panel 522, an operation on the icons or an input of a character string on an entry field of the window, or receives a request of scrolling a displayed image through the scrollbars.

The main control unit 501 has a touch screen control function with which it determines, by executing the operation detection control, whether the operation position on the control panel 522 is in the overlapping portion that overlaps the display panel 521 (display area) or in the remaining outer-edge portion that does not overlap the display panel 521 (nondisplay area) and with which it controls the sensitive areas of the control panel 522 or the display positions of the software keys.

The main control unit 501 can detect a gesture operation performed on the control panel 522 and execute a preset function in accordance with the detected gesture operation. The gesture operation is not a conventional simple touch operation but an operation of drawing a trail using a finger or the like, an operation of concurrently specifying multiple positions, or a combination of these operations in which a trail is drawn from at least one of the multiple positions.

The camera unit 541 is a digital camera that performs electronic photographing using an imaging device such as a complementary metal oxide semiconductor (CMOS) or a charge-coupled device (CCD). The above-described imaging module 100 is used in this camera unit 541.

Under the control of the main control unit 501, the camera unit 541 can convert image data obtained from photographing into image data compressed in a form of JPEG (created by Joint Photographic coding Experts Group) or in another form and record the image data in the storage unit 550 or output the image data through the external input/output unit 560 or the wireless communication unit 510. As illustrated in FIG. 18, in the smartphone 500, the camera unit 541 is installed on the back surface opposing the display input unit 520. However, the position at which the camera unit 541 is installed is not limited to this. The camera unit 541 may be installed on the same surface as the surface on which the display input unit 520 is installed. Alternatively, multiple camera units 541 may be installed. In the case where multiple camera units 541 are installed, the camera units 541 may be switched one from another so that one of the camera units 541 is used for photographing at a time or the multiple camera units 541 may be simultaneously used for photographing.

The camera unit 541 is usable for exerting various functions of the smartphone 500. For example, images captured by the camera unit 541 can be displayed on the display panel 521 or images captured by the camera unit 541 are usable as an input of operations of the control panel 522. In addition, when the GPS receiving unit 570 is to detect the position, it can detect the position with reference to images from the camera unit 541. Moreover, the optical axis direction of the camera unit 541 of the smartphone 500 or the current operation conditions can be determined with reference to images from the camera unit 541 without using a three-axis accelerometer or by using the camera unit 541 together with a three-axis accelerometer. Naturally, images from the camera unit 541 are usable in the application software.

[Others]

In the OIS mechanism according to this embodiment, the OIS driving coils are disposed on the base member side (stationary side) and the OIS driving magnets are disposed on the movable image-stabilizing unit side (movable side). Conversely, the OIS driving magnets may be disposed on the base member side and the OIS driving coils may be disposed on the movable image-stabilizing unit side. The lens group 12 is not limited to a group constituted by five lenses. The lens group 12 may include various lenses.

The elastic support unit according to this embodiment includes a leaf spring and suspension wires. However, the present invention is applicable to a method and a device for manufacturing an imaging module that include various types of elastic support units that support the movable image-stabilizing unit (lens group) such that the lens group is movable in a direction/directions perpendicular to the optical axis of the lens group and tiltable around an axis/axes perpendicular to the optical axis.

In each embodiment, an electromagnet is taken as an example to describe a magnetic-field applying unit according to the present invention, but magnetic-field applying units of different types that can apply a magnetic field may be used, instead. In each embodiment, the intensity of a magnetic field applied from the electromagnet 210 to the lens unit 10 (movable image-stabilizing unit 30) is measured by a gaussmeter. However, a magnetic-field-intensity measuring unit other than a gaussmeter may be used to measure the intensity of a magnetic field.

The present invention is not limited to the above-described embodiments and it should be understood that various changes or modifications may be made within the scope not departing from the spirit of the present invention.

REFERENCE SIGNS LIST

10: lens unit, 18: adhesive, 20: imaging device unit, 27: imaging device, 30: movable image-stabilizing unit, 40: elastic support unit, 50: OIS mechanism, 71: measurement-chart installation portion, 77: lens-unit holding portion, 79: imaging-device-unit holding portion, 81: adhesive supplying portion, 83: ultraviolet lamp, 85: control unit, 87: shaft, 89: measurement chart, 89A: measurement chart, 100: imaging module, 149: focus-coordinate acquiring circuit, 151: image-formation-surface calculation circuit, 153: adjustment calculation circuit, 153A: adjustment calculation circuit, 156: MTF-value calculation circuit, 200: imaging-module manufacturing device, 200A: imaging-module manufacturing device, 210: electromagnet, 215: gaussmeter, 216: gaussmeter shift mechanism, 300: magnetic-field generating unit, 301: electronic device, and 500: smartphone.

What is claimed is:

1. A method for manufacturing an imaging module,
   wherein the imaging module comprises; a lens unit having a lens group and an imaging device unit being fixed to the lens unit and having an imaging device that captures an image of an object through the lens group, and
   wherein the lens unit comprises; a movable image-stabilizing unit having the lens group and a magnetic member and an elastic support unit supporting the movable image-stabilizing unit such that the movable image-stabilizing unit is movable in a direction perpendicular to an optical axis of the lens group and tiltable around an axis perpendicular to the optical axis,
   the method comprising:
   a first step of holding the lens unit and the imaging device unit on an axis perpendicular to a measurement chart;
   a second step of changing a relative position of the lens unit and the imaging device unit, held on the axis perpendicular to the measurement chart, and the measurement chart on the axis and capturing images of the measurement chart using the imaging device at the respective relative position; and
   a third step of calculating a compensation amount using image-capturing signals acquired as a result of the imaging device capturing the images of the measurement chart, adjusting a tilt of the imaging device unit relative to the lens unit, and fixing the imaging device unit to the lens unit,
   wherein in the second step, the images are captured in a state where a magnetic field having a magnitude equal to a magnitude of a magnetic field applied to the movable image-stabilizing unit, when the lens unit is installed in an electronic device including a magnetic-field generating unit, from the magnetic-field generating unit is applied to the movable image-stabilizing unit,
   the method further comprising:
   a step of measuring an intensity of the magnetic field applied to the movable image-stabilizing unit; and
   a step of determining whether or not a measurement result of the intensity of the magnetic field is equal to the magnitude of the magnetic field applied to the movable image-stabilizing unit, when the lens unit is installed in the electronic device including the magnetic-field generating unit, from the magnetic-field generating unit.

2. The method for manufacturing the imaging module according to claim 1, wherein, in the second step, the magnetic field is applied to the movable image-stabilizing unit by an electromagnet.

3. The method for manufacturing the imaging module according to claim 1, wherein, in the third step, the lens unit and the imaging device unit are fixed to each other by causing an adhesive supplied to a portion between the lens unit and the imaging device unit to cure after a tilt of the imaging device unit relative to the lens unit is adjusted.

4. The method for manufacturing the imaging module according to claim 2, wherein, in the third step, the lens unit and the imaging device unit are fixed to each other by causing an adhesive supplied to a portion between the lens unit and the imaging device unit to cure after a tilt of the imaging device unit relative to the lens unit is adjusted.

5. The method for manufacturing the imaging module according to claim 1, wherein a pixel pitch of the imaging device is smaller than or equal to 1.0 μm.

6. The method for manufacturing the imaging module according to claim 2, wherein a pixel pitch of the imaging device is smaller than or equal to 1.0 μm.

7. The method for manufacturing the imaging module according to claim 3, wherein a pixel pitch of the imaging device is smaller than or equal to 1.0 μm.

8. The method for manufacturing the imaging module according to claim 4, wherein a pixel pitch of the imaging device is smaller than or equal to 1.0 μm.

9. The method for manufacturing the imaging module according to claim 1, the method further comprising:
   a step of controlling the intensity of the magnetic field applied to the movable image-stabilizing unit so that the measurement result of the intensity of the magnetic field is equal to the magnitude of the magnetic field applied to the movable image-stabilizing unit, when the lens unit is installed in the electronic device including the magnetic-field generating unit, from the magnetic-field generating unit, when the measurement result of the intensity of the magnetic field is not equal to the magnitude of the magnetic field applied to the movable image-stabilizing unit, when the lens unit is installed in the electronic device including the magnetic-field generating unit, from the magnetic-field generating unit.

10. The method for manufacturing the imaging module according to claim 1, wherein in the second step, an adhesive is supplied to a gap between the lens unit and the imaging device unit after adjusting the tilt of the imaging device unit relative to the lens unit.

11. An imaging-module manufacturing device, comprising:
   an imaging-device-unit holding portion that holds an imaging device unit on an axis perpendicular to a measurement chart installed on a measurement-chart installation portion, the imaging device unit having an imaging device that captures an image of an object through a lens unit having a lens group;

a lens-unit holding portion that holds the lens unit at a position on the axis between the measurement-chart installation portion and the imaging-device-unit holding portion;

a control unit that changes a relative position of the measurement-chart installation portion, the lens-unit holding portion, and the imaging-device-unit holding portion on the axis and captures images of the measurement chart installed on the measurement-chart installation portion at the respective relative position using the imaging device of the imaging device unit held by the imaging-device-unit holding portion through the lens unit held by the lens-unit holding portion;

an adjustment portion that adjusts a tilt of the imaging device unit held by the imaging-device-unit holding portion relative to the lens unit held by the lens-unit holding portion on a basis of image-capturing signals acquired as a result of the imaging device capturing the images of the measurement chart;

a unit-fixing portion that fixes the imaging device unit adjusted by the adjustment portion to the lens unit;

a magnetic-field applying portion that applies a magnetic field having a magnitude equal to a magnitude of a magnetic field applied to the lens unit in the state where the lens unit is installed in an electronic device including a magnetic-field generating unit to the lens unit; and a magnetic-field-intensity measuring portion that measures an intensity of the magnetic field applied from the magnetic-field applying portion to the lens unit, wherein the control unit determines whether or not a measurement result of the intensity of the magnetic field is equal to the magnitude of the magnetic field applied to the lens unit in the state where the lens unit is installed in the electronic device including the magnetic-field generating unit.

12. The imaging-module manufacturing device according to claim 11, wherein the magnetic-field applying portion is an electromagnet.

13. The imaging-module manufacturing device according to claim 11, wherein the magnetic-field-intensity measuring portion is movable between a measurement position, located near the lens unit and at which the intensity of the magnetic field applied to the lens unit is measurable, and a retract position, located away from the measurement position.

14. The imaging-module manufacturing device according to claim 13, wherein the measurement position is located in a space occupied by the lens unit when the lens unit is held by the lens-unit holding portion.

15. The imaging-module manufacturing device according to claim 11, wherein the unit-fixing portion fixes the lens unit and the imaging device to each other by causing an adhesive supplied to a portion between the lens unit and the imaging device unit to cure after an adjustment performed by the adjustment portion.

16. The imaging-module manufacturing device according to claim 12, wherein the unit-fixing portion fixes the lens unit and the imaging device to each other by causing an adhesive supplied to a portion between the lens unit and the imaging device unit to cure after an adjustment performed by the adjustment portion.

17. The imaging-module manufacturing device according to claim 13, wherein the unit-fixing portion fixes the lens unit and the imaging device to each other by causing an adhesive supplied to a portion between the lens unit and the imaging device unit to cure after an adjustment performed by the adjustment portion.

18. The imaging-module manufacturing device according to claim 11, wherein the imaging device captures the images of the measurement chart in the state where the magnetic field is applied to the lens unit by the magnetic-field applying portion.

19. The imaging-module manufacturing device according to claim 11, wherein the control unit controls the intensity of the magnetic field applied to the movable image-stabilizing unit so that the measurement result of the intensity of the magnetic field is equal to the magnitude of the magnetic field applied to the movable image-stabilizing unit, when the lens unit is installed in the electronic device including a magnetic-field generating unit, from the magnetic-field generating unit, when the measurement result of the intensity of the magnetic field is not equal to the magnitude of the magnetic field applied to the movable image-stabilizing unit, when the lens unit is installed in the electronic device including the magnetic-field generating unit, from the magnetic-field generating unit.

20. The imaging-module manufacturing device according to claim 11, wherein the control unit supplies an adhesive to a gap between the lens unit and the imaging device unit after adjusting the tilt of the imaging device unit relative to the lens unit.

* * * * *